US012136971B2

(12) United States Patent
Raghavan et al.

(10) Patent No.: US 12,136,971 B2
(45) Date of Patent: Nov. 5, 2024

(54) METHODS FOR COMMUNICATING TRAINING DATA TO A MACHINE LEARNING SERVER FOR BLOCKAGE MODELING AND BLOCKAGE MITIGATION

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 18/188,282

(22) Filed: Mar. 22, 2023

(65) Prior Publication Data

US 2024/0322869 A1 Sep. 26, 2024

(51) Int. Cl.
*H04B 7/0456* (2017.01)
*H04B 7/06* (2006.01)
*H04L 41/16* (2022.01)

(52) U.S. Cl.
CPC ......... *H04B 7/0456* (2013.01); *H04B 7/0634* (2013.01); *H04L 41/16* (2013.01)

(58) Field of Classification Search
CPC ...... H04B 7/0456; H04B 7/06; H04B 7/0634; H04B 7/0632; H04B 7/0626; H04L 41/16; H04L 41/145
See application file for complete search history.

(56) References Cited

U.S. PATENT DOCUMENTS

| 2022/0200676 | A1* | 6/2022 | Raghavan | ............ | H04B 7/0691 |
| 2022/0294502 | A1* | 9/2022 | Raghavan | ............ | H04B 7/0456 |
| 2023/0039254 | A1* | 2/2023 | Raghavan | ............. | G06N 3/044 |
| 2023/0170967 | A1* | 6/2023 | Raghavan | ............ | H04B 7/0639 |
| | | | | | 375/262 |
| 2023/0353203 | A1* | 11/2023 | Burghal | ............... | H04L 25/021 |

OTHER PUBLICATIONS

International Search Report and Written Opinion—PCT/US2024/017110—ISA/EPO—Jun. 20 2024 (2301402WO).
Ahmad Alammouri et al., Hand Grip Impact on 5G mmWave Mobile Devices, IEEE Access, vol. 7, May 3, 2019 (May 3, 2019), pp. 60532-60544, XP011725176, DOI: 10.1109/ACCESS.2019.2914685.

* cited by examiner

*Primary Examiner* — Khanh C Tran
(74) *Attorney, Agent, or Firm* — Holland & Hart LLP

(57) ABSTRACT

Methods, systems, and devices for wireless communication are described. A user equipment (UE) may generate blockage transformation information associated with one or more blockage scenarios based on one or more adaptive beam weights used for blockage mitigation at the UE associated with respective positions of a body or hand relative to one or more antennas of the UE. The blockage transformation information may include an indication of a transformation matrix used for a transformation of a first electric field matrix associated with a non-blockage scenario to a second electric field matrix associated with a blockage scenario. The UE may transmit a message indication the blockage transformation information to a machine learning server, which may generate adaptive beam weights for hand or body blockage mitigation based on messages received from multiple UEs. The machine learning server may transmit the adaptive beam weights to a UE entering a network.

30 Claims, 16 Drawing Sheets

METHODS FOR COMMUNICATING TRAINING DATA TO A MACHINE LEARNING SERVER FOR BLOCKAGE MODELING AND BLOCKAGE MITIGATION

TECHNICAL FIELD

The following relates to wireless communication, including methods for communicating training data to a machine learning server for blockage modeling and blockage mitigation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipments (UEs).

SUMMARY

The described techniques relate to improved methods, systems, devices, and apparatuses that support methods for communicating training data to a machine learning server for blockage modeling and blockage mitigation. For example, the described techniques provide for a UE to generate blockage transformation information associated with one or more blockage scenarios based on one or more adaptive beam weights used for blockage mitigation at the UE. The one or more blockage scenarios may be associated with respective positions of a body, hand(s), or finger(s) relative to one or more antennas of the UE. In some aspects, the blockage transformation information may include an indication of a transformation matrix used for a transformation of a first electric field matrix associated with a non-blockage scenario to a second electric field matrix associated with a blockage scenario. The UE may transmit a message indicating the blockage transformation information to a machine learning server, and the machine learning server may generate adaptive beam weights for hand or body blockage mitigation, for example, based on respective messages including blockage transformation information received from multiple UEs. In some examples, the machine learning server may transmit the adaptive beam weights to a UE that enters a network (e.g., a UE newly connecting to the network or reconnecting to the network after disruptions in communications).

An apparatus for wireless communication at a UE is described. The apparatus may include a processor, memory coupled (e.g., operatively, communicatively, functionally, electronically, or electrically) with the processor, and instructions stored in the memory. The instructions may be executable by the processor to cause the apparatus to generate blockage transformation information associated with one or more blockage scenarios based on one or more adaptive beam weights used for blockage mitigation at the UE, the one or more blockage scenarios associated with respective positions of a body or hand relative to one or more antennas of the UE, where the blockage transformation information includes an indication of a transformation matrix used for a transformation of a first electric field matrix associated with a non-blockage scenario to a second electric field matrix associated with a blockage scenario and transmit, to a machine learning server, a message indicating the blockage transformation information based on generating the blockage transformation information.

A method for wireless communication at a UE is described. The method may include generating blockage transformation information associated with one or more blockage scenarios based on one or more adaptive beam weights used for blockage mitigation at the UE, the one or more blockage scenarios associated with respective positions of a body or hand relative to one or more antennas of the UE, where the blockage transformation information includes an indication of a transformation matrix used for a transformation of a first electric field matrix associated with a non-blockage scenario to a second electric field matrix associated with a blockage scenario and transmitting, to a machine learning server, a message indicating the blockage transformation information based on generating the blockage transformation information.

Another apparatus for wireless communication at a UE is described. The apparatus may include means for generating blockage transformation information associated with one or more blockage scenarios based on one or more adaptive beam weights used for blockage mitigation at the UE, the one or more blockage scenarios associated with respective positions of a body or hand relative to one or more antennas of the UE, where the blockage transformation information includes an indication of a transformation matrix used for a transformation of a first electric field matrix associated with a non-blockage scenario to a second electric field matrix associated with a blockage scenario and means for transmitting, to a machine learning server, a message indicating the blockage transformation information based on generating the blockage transformation information.

A non-transitory computer-readable medium storing code for wireless communication at a UE is described. The code may include instructions executable by a processor (e.g., directly, indirectly, after pre-processing, without pre-processing) to generate blockage transformation information associated with one or more blockage scenarios based on one or more adaptive beam weights used for blockage mitigation at the UE, the one or more blockage scenarios associated with respective positions of a body or hand relative to one or more antennas of the UE, where the blockage transformation information includes an indication of a transformation matrix used for a transformation of a first electric field matrix associated with a non-blockage scenario to a second electric field matrix associated with a blockage scenario and transmit, to a machine learning server, a message indicating the blockage transformation information based on generating the blockage transformation information.

Some examples of the method, apparatuses, and non-transitory computer-readable medium described herein may further include operations, features, means, or instructions for transmitting, to the machine learning server, an indication of blockage information corresponding to blockage caused by a position of the body or hand relative to the one or more antennas.

In some examples of the method, apparatuses, and non-transitory computer-readable medium described herein, the blockage information includes one or both of hand grip information or skin properties, the skin properties including a conductivity value, a dielectric constant, permittivity information, or a combination thereof.

In some examples of the method, apparatuses, and non-transitory computer-readable medium described herein, the blockage transformation information corresponds to the one or more blockage scenarios based on the blockage information.

Some examples of the method, apparatuses, and non-transitory computer-readable medium described herein may further include operations, features, means, or instructions for selecting the one or more adaptive beam weights for the blockage mitigation based on one or more codebooks configured at the UE and transmitting, to the machine learning server, an indication of the one or more adaptive beam weights associated with the blockage mitigation at the UE.

Some examples of the method, apparatuses, and non-transitory computer-readable medium described herein may further include operations, features, means, or instructions for transmitting, to the machine learning server, an indication of antenna properties associated with the one or more antennas of the UE.

In some examples of the method, apparatuses, and non-transitory computer-readable medium described herein, the antenna properties include antenna array geometry, antenna array dimensions, antenna module placement, inter-antenna element spacing information, housing properties, a dielectric constant, or any combination thereof.

Some examples of the method, apparatuses, and non-transitory computer-readable medium described herein may further include operations, features, means, or instructions for performing, for each antenna element of the one or more antennas of the UE, a transformation of data from the first electric field matrix associated with the non-blockage scenario to data from the second electric field matrix associated with the blockage scenario, where the blockage transformation information may be generated based on performing the transformation.

In some examples of the method, apparatuses, and non-transitory computer-readable medium described herein, the blockage transformation information corresponds to a quantization of information associated with the transformation, the quantization of information including a quantization of one or more sample angles and one or more quantized values of phases or gains.

Some examples of the method, apparatuses, and non-transitory computer-readable medium described herein may further include operations, features, means, or instructions for receiving, from a network entity, a control message including a second set of adaptive beam weights for blockage mitigation in response to joining a network, where the second set of adaptive beam weights may be based on one or more machine learning functions and performing a blockage mitigation procedure based on the second set of adaptive beam weights.

In some examples of the method, apparatuses, and non-transitory computer-readable medium described herein, the first electric field matrix represents a polarized set of electric fields across a set of multiple antenna elements at the UE associated with the non-blockage scenario and the second electric field matrix represents a polarized set of electric fields across the set of multiple antenna elements at the UE associated with the blockage scenario.

In some examples of the method, apparatuses, and non-transitory computer-readable medium described herein, the one or more adaptive beam weights include a set of multiple adaptive beam weights associated with a respective hand or body blockage scenario.

An apparatus for wireless communication is described. The apparatus may include a processor, memory coupled (e.g., operatively, communicatively, functionally, electronically, or electrically) with the processor, and instructions stored in the memory. The instructions may be executable by the processor to cause the apparatus to receive, from a set of multiple UEs, respective messages that each indicate blockage transformation information associated with one or more blockage scenarios at a respective UE of the set of multiple UEs, the one or more blockage scenarios associated with a position of a respective body or hand relative to one or more antennas of the respective UE, generate a set of adaptive beam weights using a machine learning model based on the blockage transformation information, and transmit, to a first UE, the set of adaptive beam weights for blockage mitigation at the first UE based on generating the set of adaptive beam weights.

A method for wireless communication is described. The method may include receiving, from a set of multiple UEs, respective messages that each indicate blockage transformation information associated with one or more blockage scenarios at a respective UE of the set of multiple UEs, the one or more blockage scenarios associated with a position of a respective body or hand relative to one or more antennas of the respective UE, generating a set of adaptive beam weights using a machine learning model based on the blockage transformation information, and transmitting, to a first UE, the set of adaptive beam weights for blockage mitigation at the first UE based on generating the set of adaptive beam weights.

Another apparatus for wireless communication is described. The apparatus may include means for receiving, from a set of multiple UEs, respective messages that each indicate blockage transformation information associated with one or more blockage scenarios at a respective UE of the set of multiple UEs, the one or more blockage scenarios associated with a position of a respective body or hand relative to one or more antennas of the respective UE, means for generating a set of adaptive beam weights using a machine learning model based on the blockage transformation information, and means for transmitting, to a first UE, the set of adaptive beam weights for blockage mitigation at the first UE based on generating the set of adaptive beam weights.

A non-transitory computer-readable medium storing code for wireless communication is described. The code may include instructions executable by a processor (e.g., directly, indirectly, after pre-processing, without pre-processing) to receive, from a set of multiple UEs, respective messages that each indicate blockage transformation information associated with one or more blockage scenarios at a respective UE of the set of multiple UEs, the one or more blockage scenarios associated with a position of a respective body or hand relative to one or more antennas of the respective UE, generate a set of adaptive beam weights using a machine learning model based on the blockage transformation information, and transmit, to a first UE, the set of adaptive beam weights for blockage mitigation at the first UE based on generating the set of adaptive beam weights.

Some examples of the method, apparatuses, and non-transitory computer-readable medium described herein may further include operations, features, means, or instructions for receiving, from the set of multiple UEs, respective indications of blockage information corresponding to blockage caused by a position of the respective body or hand relative to the one or more antennas of the respective UE, where generating the set of adaptive beam weights using the machine learning model may be based on the blockage information.

In some examples of the method, apparatuses, and non-transitory computer-readable medium described herein, the blockage information includes one or both of hand grip information or skin properties, the skin properties including a conductivity value, a dielectric constant, permittivity information, or a combination thereof.

In some examples of the method, apparatuses, and non-transitory computer-readable medium described herein, the blockage transformation information corresponds to one or more blockage scenarios based on the blockage information.

Some examples of the method, apparatuses, and non-transitory computer-readable medium described herein may further include operations, features, means, or instructions for receiving, from the set of multiple UEs, respective indications of adaptive beam weights associated with the blockage mitigation at the set of multiple UEs, where generating the set of adaptive beam weights using the machine learning model may be based on the adaptive beam weights associated with the blockage mitigation at the set of multiple UEs.

Some examples of the method, apparatuses, and non-transitory computer-readable medium described herein may further include operations, features, means, or instructions for receiving, from the set of multiple UEs, respective indications of antenna properties associated with the set of multiple UEs, where generating the set of adaptive beam weights using the machine learning model may be based on the antenna properties.

In some examples of the method, apparatuses, and non-transitory computer-readable medium described herein, the antenna properties include antenna array geometry, antenna array dimensions, antenna module placement, inter-antenna element spacing, housing properties, or any combination thereof.

In some examples of the method, apparatuses, and non-transitory computer-readable medium described herein, the blockage transformation information includes a transformation matrix for a transformation of a first matrix of electric fields associated with a non-blockage scenario to a second matrix of electric fields associated with a blockage scenario.

In some examples of the method, apparatuses, and non-transitory computer-readable medium described herein, the first matrix represents a polarized set of electric fields across a set of multiple antenna elements at a respective UE of the set of multiple UEs and associated with the non-blockage scenario and the second matrix represents a polarized set of electric fields across the set of multiple antenna elements at the respective UE and associated with the blockage scenario.

In some examples of the method, apparatuses, and non-transitory computer-readable medium described herein, the blockage transformation information corresponds to a quantization of information associated with respective transformations by the set of multiple UEs, the quantization of information including a quantization of one or more sample angles and one or more quantized values of phases or gains.

In some examples of the method, apparatuses, and non-transitory computer-readable medium described herein, the set of adaptive beam weights may be transmitted to the first UE in response to the first UE joining a network.

In some examples of the method, apparatuses, and non-transitory computer-readable medium described herein, the set of adaptive beam weights includes a set of multiple adaptive beam weights associated with a respective hand blockage scenario.

DETAILED DESCRIPTION

Figure 1:
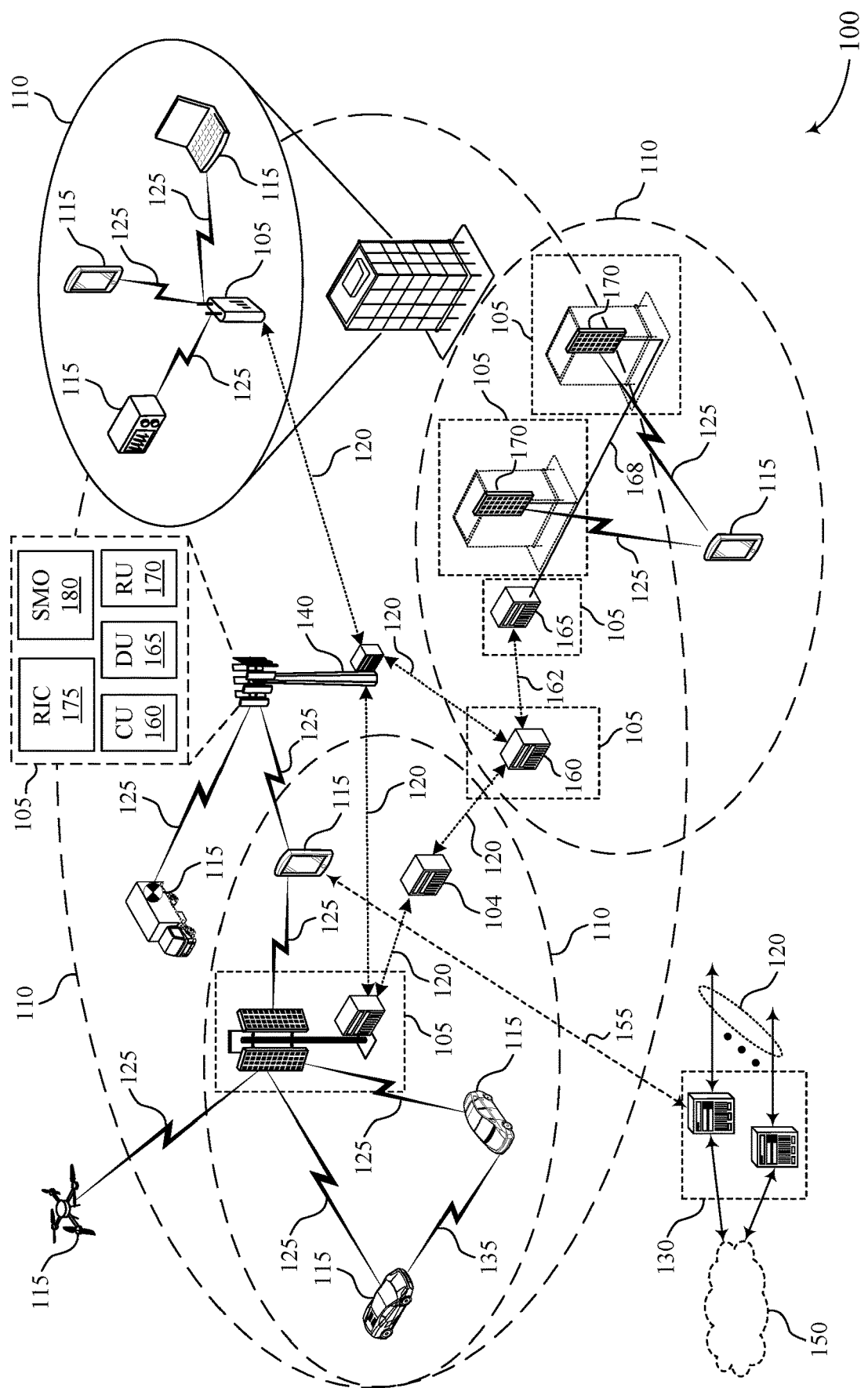
FIG. 1 illustrates an example of a wireless communications system that supports methods for communicating training data to a machine learning server for blockage modeling and blockage mitigation in accordance with one or more aspects of the present disclosure.

In some examples, a UE within a wireless communications system may experience interference due to hand blockage or body blockage from a user holding the device (e.g., proximity-based blockage when a hand or part of a body blocks or otherwise interferes with one or more antenna elements of the UE). In some cases, to reduce or mitigate blockage, the UE may be configured with one or more analog or hybrid beamforming codebooks. For example, the UE may be configured with one or more analog or hybrid beamforming codebooks (e.g., directional codebooks where energy is steered in a beamspace along a set of quantized directions), and the UE may determine one or more communication parameters (e.g., adaptive beam weights) based on the one or more analog or hybrid beamforming codebooks to adapt to the hand blockage and perform blockage mitigation. In some cases, determining the one or more communication parameters may involve performing one or more measurements based on one or more reference signals, such as signal strength measurements or channel impulse response (CIR) measurements. However, as the UE may be configured with a relatively large quantity of analog beamforming or hybrid beamforming codebooks, determining the communication parameters may involve relatively large amounts of computations and processing at the UE due to the relatively large quantities of possible communication parameter combinations associated with the analog or hybrid beamforming codebooks.

As such, using machine learning techniques to decrease learning periods associated with blockage mitigation at a UE may be desired. Machine learning techniques, however, may be difficult to implement, as hand blockage impairments may depend on various (e.g., user-specific) properties associated with the hand blockage, such as skin properties, hand grip, and/or holding types (e.g., how a device is held by a user). Further, the hand blockage impairments may also depend on specific (e.g., device-specific) properties of each UE experiencing the hand blockage, such as antenna module geometry, antenna module placement, quantity of antenna elements, device housing, or other properties.

In accordance with examples as described herein, a wireless communications system may support the operation of a machine learning server for generating adaptive beam weights for blockage mitigation, where the machine learning server may receive federated blockage information from multiple UEs. For example, the machine learning server may receive messages indicating blockage information from one or more UEs, and the machine learning server may generate mitigation parameters based on the received blockage information. In some examples, the blockage information may include blockage transformation information associated with transforming an electric field matrix associated with a non-blockage scenario to an electric field matrix associated with a blockage scenario. Additionally, or alternatively, the blockage information may include information about the blockage scenario, such as skin properties or grip types, information about the UE sending the blockage information, adaptive beam weights utilized by the UE to mitigate blockage, or other information. In some cases, the machine learning server may generate adaptive beam weights based on the blockage information, and the machine learning server may indicate the adaptive beam weights to a UE that has recently entered a network. Accordingly, learning periods and processing associated with blockage mitigation at the UE 115 may be reduced, thereby enabling increased efficiency for blockage mitigation procedures.

Aspects of the disclosure are initially described in the context of wireless communications systems. Aspects of the disclosure are additionally described with respect to transformation diagrams and process flows. Aspects of the disclosure are further illustrated by and described with reference to apparatus diagrams, system diagrams, and flowcharts that relate to methods for communicating training data to a machine learning server for blockage modeling and blockage mitigation.

FIG. 1 illustrates an example of a wireless communications system 100 that supports methods for communicating training data to a machine learning server for blockage modeling and blockage mitigation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein. Components within the wireless communication system 100 may be coupled (for example, operatively, communicatively, functionally, electronically, and/or electrically) to each other.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support methods for communicating training data to a machine learning server for blockage modeling and blockage mitigation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, or a personal computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

Wireless communications system 100 may support artificial intelligence (AI) and machine learning techniques to enhance over the air communications or other system information communications via the air interface between a UE and a network entity 105. For example, AI and machine learning techniques may be used in wireless communications system 100 to support enhancements to beam management such as enhancements in beam prediction, spatial domain beamforming for overhead and latency reduction, increased beam selection accuracy including accuracy enhancements for different scenarios including those associated with heavy non-line of sight (NLOS) beamforming conditions, among other examples.

In some implementations of AI and machine learning, network entities 105 and interface procedures may support data management and model management for different AI and machine learning models that may be implemented. For example, a network entity may support multi-vendor interoperability between different AI and machine learning functions such as data collection, model training, and model inference. Additionally, or alternatively, a network entity 105 may support integration and collaboration of additional communications techniques such as orbital angular momentum (OAM), core network functions, new generation networks, and air interface implementations with AI and machine learning.

Some implementations of machine learning may include use of a neural network function (NNF), which may take the form of Y=F(X) as supported by a corresponding neural network model, which includes a relatively large quantity of interconnected processing units or nodes. A NNF may use a standardized input (X) and output (Y), along with information element support for inter-vendor interworking and flexible vendor implementations. An NNF may be classified or identified by a standardized or non-standardized NNF identifier (e.g., based on public and private extensions), and one single NNF may support multiple models based on implementations. For example, a neural network model may include a model structure and a parameter set (e.g., defined by an operator, vendor, or other third party). The model structure may correspond to a model identifier (e.g., model identifier that is unique to the network) which includes a default parameter set, and is associated with a corresponding NNF. The parameter set of the neural network model may include weights of the neural network model along with other model configuration parameters, such as location or configuration-specific parameters.

In some examples, a UE 115 within a wireless communications system may experience interference caused by hand blockage (e.g., or body blockage) from a user holding the device. In some cases, to reduce or mitigate blockage, the UE 115 may be configured with one or more codebooks. For example, the UE 115 may be configured with one or more codebooks (e.g., analog or hybrid beamforming codebooks, which may be directional codebooks), and the UE 115 may determine one or more communication parameters (e.g., adaptive beam weights) based on the one or more codebooks to adapt to the hand blockage and perform blockage mitigation. In some cases, determining the one or more communication parameters may involve performing one or more measurements based on one or more reference signals, such as signal strength measurements or CIR measurements. However, as the UE 115 may be configured with a relatively large quantity of analog beamforming or hybrid beamforming codebooks, determining some communication parameters may involve relatively large amounts of computations and processing at the UE 115 due to the relatively large quantities of possible communication parameter combinations associated with the analog beamforming or hybrid beamforming codebooks.

As such, using machine learning techniques to decrease learning periods associated with blockage mitigation at the UE 115 may be desired. However, machine learning techniques may be relatively difficult to implement, as hand blockage impairments may depend on various properties associated with the hand blockage, such as skin properties, grip types, and/or hold types, or other user-specific properties and actions. Further, the hand blockage impairments may also depend on specific properties of each UE 115 experiencing the hand blockage, such as antenna module geometry, antenna module placement, quantity of antenna elements, device housing, or other device-specific properties.

The wireless communications system 100 may support operation of a machine learning server used to obtain blockage information (e.g., blockage transformation information) from multiple UEs 115. For example, the machine learning server may receive respective messages indicating blockage information from one or more UEs 115 and may generate mitigation parameters based on the received blockage information. In some examples, the blockage information may include blockage transformation information associated with transforming an electric field matrix associated with a non-blockage scenario to an electric field matrix associated with a blockage scenario. Additionally, or alternatively, the blockage information may include information about the blockage scenario, such as skin properties or grip types of a user, information about the UE 115 sending the blockage information (e.g., antenna configuration, array geometry, array dimensions), adaptive beam weights utilized by the UE 115 to mitigate blockage, or other information. In some cases, the machine learning server may generate adaptive beam weights based on the blockage information, for example, using one or more machine learning algorithms, and the machine learning server may indicate the adaptive beam weights to a UE 115 that has recently entered a network. Accordingly, learning periods and processing associated with blockage mitigation at the UE 115 may be reduced.

Figure 2:
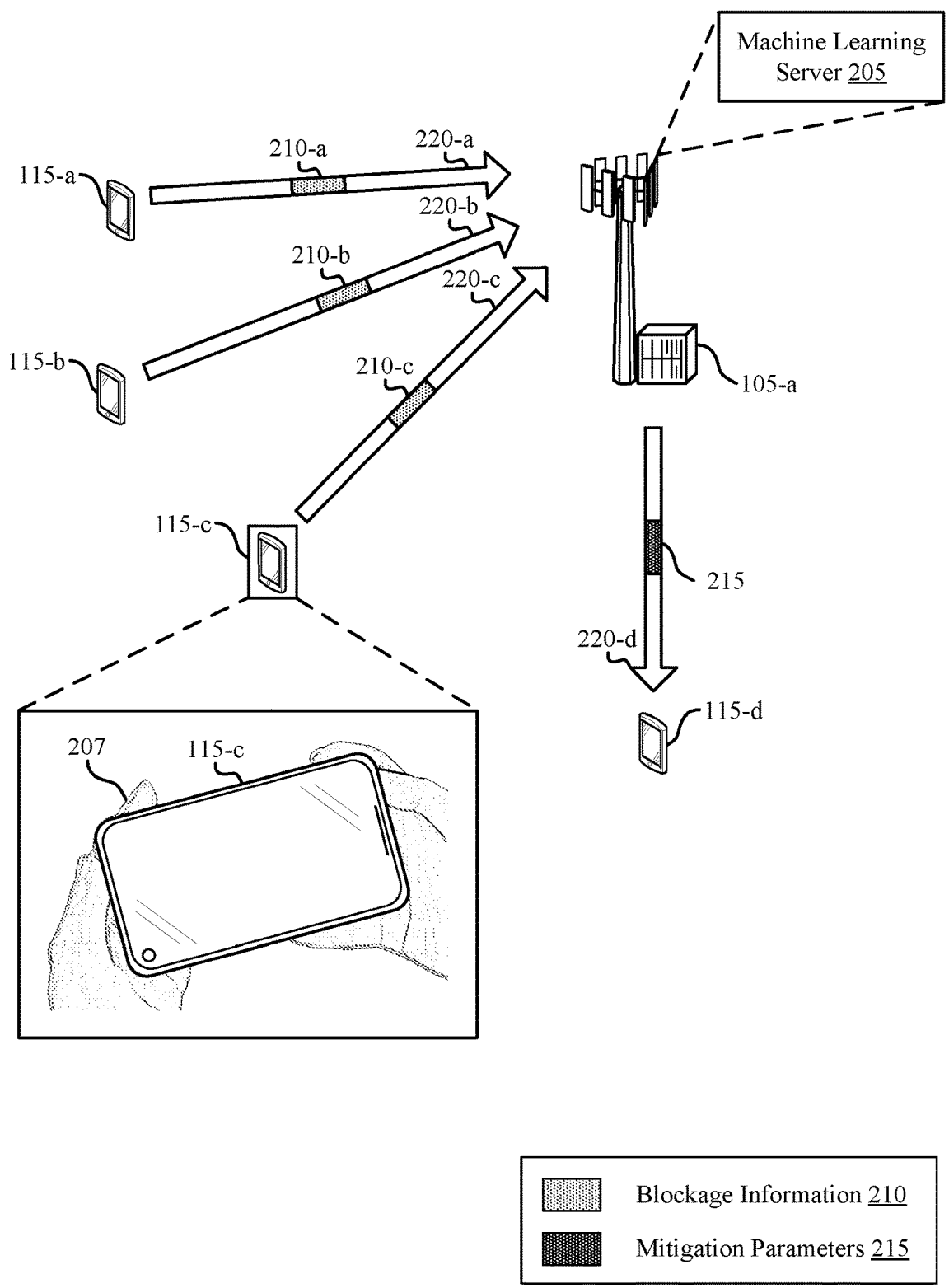
FIG. 2 illustrates an example of a wireless communications system that supports methods for communicating training data to a machine learning server for blockage modeling and blockage mitigation in accordance with one or more aspects of the present disclosure.

FIG. 2 illustrates an example of a wireless communications system 200 that supports methods for communicating training data to a machine learning server for blockage modeling and blockage mitigation in accordance with one or more aspects of the present disclosure. The wireless communications system 200 may include a UE 115-a, a UE 115-b, a UE 115-c, a UE 115-d, and a network entity 105-a, which may be examples of corresponding components as described herein, with reference to FIG. 1. The UE 115-a, the UE 115-b, the UE 115-c, and the UE 115-d, may engage in communication with the network entity 105-a via a communication link 220-*a*, a communication link 220-*b*, a communication link 220-*c*, and a communication link 220-*d*, respectively.

In some examples, a device may experience impairments due to hand blockage or body blockage from a user holding the device. For example, the UE 115-*c* (e.g., or any other UE 115) may experience blockage caused by a part of a body 207 (e.g., hands, fingers, arms, or another portion or part of a body) in relatively close proximity the UE 115-*c* (e.g., in relatively close proximity to one or more antennas or antenna arrays of the UE 115-*c*) that may impair wireless communications with the network entity 105-*a* or other devices. In some aspects, the proximity of the part of the body 207 may be detected by the UE 115-*c* using one or more sensors, such as one or more maximum permissible exposure (MPE) sensors, capacitive sensors, proximity sensors, or other sensors. The UE 115-*c* may experience the impairment while operating at any frequency, but in some examples the impairment caused by a hand or body may be relatively more prominent when the UE 115-*c* operates using relatively higher frequencies, such as millimeter wave (mm-Wave) frequencies and other frequencies (e.g., frequencies greater than 6 GHz, frequencies between about 24 GHz and about 100 GHz, frequencies between about 30 GHz and about 300 GHz, frequencies between about 52.6 GHz and 71 GHz, frequencies in the so-called Frequency Range 4 (FR4), frequencies in the so-called Frequency Range 2-2 (FR2-2), sub-terahertz frequency ranges, among other examples).

In some examples, to reduce or mitigate the blockage impairment, a UE 115 may be configured with one or more analog beamforming or hybrid beamforming codebooks. For example, the UE 115-*a* may be configured with one or more codebooks (e.g., directional codebooks), and the UE 115-*a* may determine one or more communication parameters (e.g., adaptive beam weights, which may correspond to amplitude control schemes with multiple levels of amplitude control or phase-only control schemes) based on the one or more codebooks to adapt to the blockage and perform blockage mitigation. In particular, amplitude control may be binary (e.g., may be enabled or disabled for each antenna element) or may be selected from a fixed set of pre-stored amplitude levels (e.g., pre-defined amplitude levels). The UE 115-*a* may perform one or more measurements based on one or more reference signals, such as signal strength measurements or CIR measurements (e.g., on some reference signals), to determine the one or more communication parameters. In some cases, the UE 115-*a* may be configured with a relatively large quantity of codebooks (e.g., analog beamforming codebooks, hybrid beamforming codebooks), which may give the UE 115-*a* relatively increased quantity of possible communication parameter combinations to mitigate blockage.

Performing measurements to mitigate hand blockage (e.g., or body blockage, such as arm blockage), however, may be associated with relatively high overhead, increased delays, and increased processing power at the UE 115-*a* and other devices (e.g., particularly as antenna dimensions increase at the UE 115-*a* and/or based on relatively increased antenna dimensions at customer premises equipment (CPEs), intelligent reflective surface (IRS) nodes, network entities 105, and other such devices having various form factors). Further, finding a combination of communication parameters that may effectively mitigate hand blockage may be associated with a long learning period for searching the codebooks and performing measurements, especially for large codebook sizes. As such, using machine learning techniques to decrease learning periods at a UE 115 may be desired. However, machine learning techniques may be difficult to implement as hand blockage impairments may depend on various properties associated with the hand blockage, such as skin properties, hand grip, and/or ways in which the UE 115 is held, as well as device properties of each UE 115 experiencing the hand blockage, such as antenna properties of one or more antenna elements of a UE 115 or housing properties of the UE 115.

In accordance with examples as described herein, the wireless communications system 200 may support operation of a machine learning server 205. The machine learning server 205 may receive messages indicating blockage information 210 from one or more UEs 115 and may generate mitigation parameters 215 based on the received blockage information 210. For example, the machine learning server 205 may obtain blockage information 210-*a* from the UE 115-*a*, blockage information 210-*b* from the UE 115-*b*, and blockage information 210-*c* from the UE 115-*c*. In some examples, the machine learning server 205 may be or be otherwise located within (e.g., as component of) the network entity 105-*a*, as shown. Alternatively, the machine learning server 205 may be a standalone device which may be in communication with one or more UEs 115 and the network entity 105-*a*, for example.

In some examples, the blockage information 210 may include blockage transformation information. For example, the UE 115-*a* may determine a transformation matrix associated with a transformation of an electric field matrix associated with a non-blockage scenario to an electric field matrix associated with a blockage scenario. Accordingly, the UE 115-*a* may include an indication of a first transformation matrix within the blockage information 210-*a*, the UE 115-*b* may include an indication of a second transformation matrix within the blockage information 210-*b*, etc. As such, the UEs 115 (e.g., the UE 115-*a*, the UE 115-*b*, and the UE 115-*c*) may indicate the machine learning server 205 of transformation matrices, which may provide the machine learning server 205 with information regarding hand blockage at each of the UEs 115. Electric field matrices and transformation matrices are described in more detail herein, with reference to FIG. 3.

Additionally, or alternatively, the UEs 115 may indicate beam weights (e.g., adaptive beam weights) within blockage information 210. For example, the UE 115-*a* may determine one or more beam weights or other communication parameters to mitigate hand blockage scenarios using non-machine learning techniques, such as beam measurements based on one or more codebooks. The UE 115-*a* may include an indication of the one or more beam weights or other communication parameters within the blockage information 210-*a*. Accordingly, the machine learning server 205 may receive information regarding adaptive beam weights that are currently being used by the UEs 115 to (e.g., at least partially) mitigate hand blockage or body blockage.

In some examples, the UEs 115 may indicate information associated with one or more blockage scenarios within the blockage information 210 (e.g., which may include transformation matrices, beam weights, and other information). For example, the UE 115-*a* may determine the blockage information 210-*a* (e.g., a transformation matrix, adaptive beam weights, or other information as described herein) associated with a blockage scenario, which may include an indication of the blockage scenario within the blockage information 210-*a*. The blockage information 210-*a* may be associated with different grip types (e.g., finger grips), skin properties (e.g., skin type, texture, coverings such as gloves, conductivity values, dielectric constants, permittivity values, or other skin properties or measurements associated with the skin), or a combination thereof, and the UE 115-*a* may include an indication of the grip types and skin information within the blockage information 210-*a*. In some examples, the blockage information 210-*a* may include an indication of multiple blockage scenarios associated with multiple respective transformation matrices (e.g., or adaptive beam weights, or both).

In some cases, the UE 115-*a* may determine grip types or skin properties associated with hand blockage using sensors, such as optical, electrical or pressure sensors. The sensors may be used to determine a grip with which the UE 115-*a* is being held, skin properties such as dielectric constants, permittivity values, or conductivity values, or a combination thereof. Additionally, or alternatively, the UE 115-*a* may request input or information (e.g., from a user) to determine the properties associated with the hand blockage at a given time. For example, the UE 115-*a* may ask for input from a user regarding a current or most commonly utilized grip type or style. Additionally, or alternatively, the UE 115-*a* may request a user to utilize one or more grip types while the UE 115-*a* performs measurements corresponding to a blockage scenario associated with a respective grip type. The UE 115-*a* may determine the blockage information 210-*a* corresponding to one or more blockage scenarios using any of these techniques, and the UE 115-*a* may indicate these to the machine learning server 205. That is, the UE 115-*a* may determine information (e.g., transformation matrices, beam weights, or other information), associated with a plurality of blockage scenarios (e.g., related to different grip types, skin properties other properties, or a combination thereof), and the UE 115-*a* may indicate the information and the corresponding blockage scenario within the blockage information 210-*a*.

In some examples, the UEs 115 may indicate device properties to the machine learning server 205 (e.g., within the blockage information 210). For example, the UE 115-*a* may indicate device information, which may include antenna properties of one or more antenna elements of the UE 115-*a*, such as antenna array configurations, (e.g., including antenna geometry, antenna array dimensions, or both), antenna module placement (e.g., within the UE 115-*a*), inter-antenna element spacing information (e.g., spacing between antenna elements or antenna panels), or any combination thereof. Further, the UE 115-*a* may indicate housing (e.g., device housing) information, which may include housing geometry information, one or more dielectric constants associated with the housing, or any combination thereof. In some examples, The device information may be included within the blockage information 210. Alternatively, the UE 115-*a* may transmit a message indicating the device information (e.g., the antenna properties or housing information) in a separate occasion than a message containing the blockage information 210. For example, the UE 115-*a* may transmit the message indicating device information prior to communicating the blockage information 210, or the machine learning server 205 may otherwise obtain or be aware of the device information corresponding to each of the UEs 115 (e.g., through information obtained from the network entity 105-*a*).

The machine learning server 205 may receive blockage information 210 from multiple UEs 115. The machine learning server 205 may federate the received blockage information 210 and use the blockage information 210 as training data for a machine learning model (e.g., a machine learning framework or system). In some examples, the machine learning server 205 may utilize properties associated with a blockage scenario (e.g., grip types, skin property information, or any combination thereof) and device information (e.g., antenna properties or housing properties) as inputs for the machine learning model. The outputs for the machine learning model may be one or more mitigation parameters 215 which may include one or more beam weights (e.g., adaptive beam weights) corresponding to a blockage scenario associated with the input properties. As such, the machine learning server 205 may generate mitigation parameters 215 associated with multiple blockage scenarios that may be input into the machine learning model using the machine learning model.

In some cases, the machine learning model may additionally output a confidence value (e.g., a degree of confidence) associated with generated mitigation parameters 215, as there may be some uncertainty associated with generated values due to variance between the properties associated with the blockage scenarios received in blockage information 210 from UEs 115 for training purposes and the properties associated with a blockage scenario used as an input by the machine learning server 205 for prediction (e.g., generation) purposes. In some examples, some assumptions may be made when using a transformation matrix for obtaining values associated with the blockage scenarios. For example, a linear transformation matrix may be sufficient for transforming non-blockage electric fields to blockage electric fields. Further, a transformation matrix that is angle dependent (e.g., azimuth and polar angle dependent) may apply to different behaviors across different angles, and a same transformation matrix may be sufficient to cover behaviors for all antenna elements of a UE 115. In some aspects, different blockage types (e.g., air gaps between an antenna module and a hand, a quantity of fingers associated with the blockage, materials present, or other blockage conditions as described herein) may be associated with different transformation matrices.

In some examples, the machine learning server 205 (e.g., via the network entity 105-*a*) may provide mitigation parameters 215 (e.g., one or more adaptive beam weights) and, in some examples, associated confidence values generated based on the machine learning model to one or more UEs 115. In some cases, a UE 115 may transmit an indication of a blockage scenario to the machine learning server 205, and the machine learning server 205 may use the blockage scenario as an input for the machine learning model to generate the mitigation parameters 215. Additionally, or alternatively, the machine learning server 205 may send mitigation parameters 215 to UEs 115 as the UEs 115 join or reconnect to the network (e.g., based on a general, most-common, or default blockage scenario). For example, the machine learning server 205 may transmit a message indicating mitigation parameters 215 to the UE 115-*d*.

The UE 115-*d* may utilize the mitigation parameters 215 to mitigate hand blockage at the UE 115-*d*. In some cases, the UE 115-*d* may use the mitigation parameters 215 as a starting point or initial parameters for hand blockage mitigation. For example, the UE 115-*d* may begin using the mitigation parameters 215 to reduce or mitigate hand blockage, but may perform measurements (e.g., of reference signals) to obtain additional parameters (e.g., based on codebooks, as described herein) to obtain new mitigation parameters 215 or refine the mitigation parameters 215 received from the machine learning server 205.

By receiving the mitigation parameters 215 from the machine learning server 205, time spent performing hand blockage mitigation procedures at the UE 115-*d* may be decreased. Further, overhead and measurements performed by the UE 115-*d* may be reduced, which may reduce complexity associated with mitigation procedures.

Figure 3:
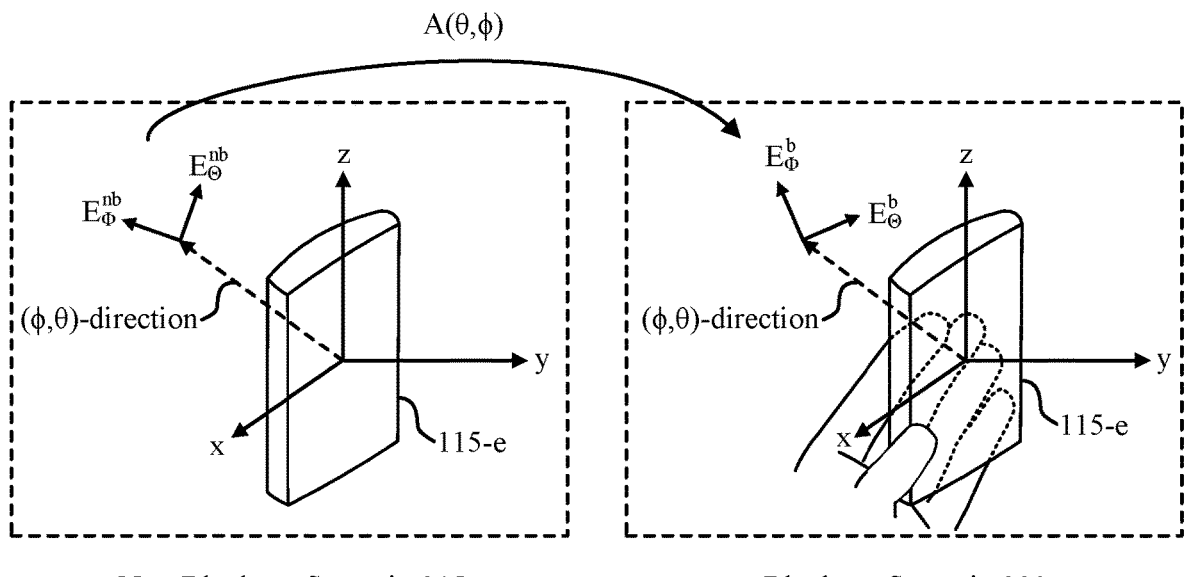
FIG. 3 illustrates an example of a transformation diagram that supports methods for communicating training data to a machine learning server for blockage modeling and blockage mitigation in accordance with one or more aspects of the present disclosure.

FIG. 3 illustrates an example of a transformation diagram 300 that supports methods for communicating training data to a machine learning server for blockage modeling and blockage mitigation in accordance with one or more aspects of the present disclosure. The system 300 may include a UE 115-*e*, which may be an example of a UE 115 as described herein, with reference to FIGS. 1 and 2. In some examples, the UE 115-*e* may experience interference due to hand or body blockage from a user holding the device, which may be more prominent while operating at higher frequencies.

The UE 115-*e* may obtain electric field matrices corresponding to electric field measurements under different blockage scenarios. For example, the UE 115-*e* may obtain an electric field matrix 305-*a* representing an electric field associated with (e.g., measured in) a non-blockage scenario 315 (e.g., $E^{nb}$). Similarly, the UE 115-*e* may obtain an electric field matrix 305-*b* representing an electric field associated with a blockage scenario 320 (e.g., $E^b$), such as by performing measurements when experiencing the blockage scenario 320. The blockage scenario 320 may be associated with various properties that may affect hand blockage, such as skin properties, grip types, antenna module geometry, antenna module placement, device housing, or other properties, as described herein with reference to FIG. 2.

In some examples, the electric field matrix 305-*a* and the electric field matrix 305-*b* may include electric field values associated with multiple antenna elements. For example, the UE 115-*e* may have (e.g., at least) N antenna elements, and the electric field matrix 305-*a* and the electric field matrix 305-*b* may include elements for each of the N antenna elements. Consequently, the electric field matrix 305-*a* and the electric field matrix 305-*b* may each be N×2 matrices. In some examples, the electric field matrix 305-*a* and the electric field matrix 305-*b* may include electric field measurements in terms of a spherical coordinate system. For example, the electric field matrix may include a Θ component and a Φ component corresponding to a polar direction θ and an azimuth direction ϕ for each antenna element.

In some examples, electric field components may vary based on a polar angle θ and an azimuth angle ϕ of the spherical coordinate system. Thus, each electric field component of the electric field matrix 305-*a* and the electric field matrix 305-*b* may be dependent on (e.g., be a function of) the polar angle θ and the azimuth angle ϕ. As such, $E_{\Theta,1}^{nb}(\theta, \phi)$ may refer to the Θ component of the electric field corresponding to the non-blockage scenario 315 for a first antenna element (e.g., with index equal to 1) of the UE 115-*e* as a function of the polar angle θ and the azimuth angle ϕ, and other components of the electric field matrix 305-*a* and the electric field matrix 305-*b* are represented similarly. In some cases, each electric field component may correspond to a fixed value for a radial direction r of the spherical coordinate system.

The electric field matrix 305-*a* and the electric field matrix 305-*b* may vary as a result of blockage (e.g., hand blockage) associated with the blockage scenario 320. The UE 115-*e* may obtain a transformation matrix 310 (e.g., A) that may transform the electric field matrix 305-*a* into the electric field matrix 305-*b*. In some examples, the transformation matrix 310 may correspond to a linear transformation of the electric field matrix 305-*a*, which may include a rotation (e.g., angular rotation), an amplitude transformation, or both, and the transformation matrix 310 may be a 2×2 matrix. The transformation matrix 310 may be dependent on (e.g., be a function of) the polar angle θ and the azimuth angle ϕ, and in some cases, such as when N is at least two, the UE 115-*e* may calculate the transformation matrix 310 using Equation 1:

$$A(\theta,\phi)=((E^{nb})^H(E^{nb}))^{-1} \cdot (E^{nb})^H E^b \tag{1}$$

where $E^{nb}$ refers to the electric field matrix 305-*a*. $E^b$ refers to the electric field matrix 305-*b*, and H denotes a Hermitian transpose operation.

In some cases, it may be difficult for the UE 115-*e* to obtain the electric field matrix 305-*a* corresponding to the non-blockage scenario 315 using measurements, as the UE 115-*e* may generally operate with at least some blockage present. As such, in some examples, the UE 115-*e* may be configured with an electric field matrix corresponding to the non-blockage scenario 315. For example, electric field information corresponding may be obtained (e.g., by a manufacturer) within a controlled atmosphere to provide (e.g., or at least approximate) the non-blockage scenario 315. The electric field information obtained (e.g., the electric field matrix 305-*a*) may then be configured to the UE 115-*e*. Accordingly, the UE 115-*e* may use the electric field information corresponding to the non-blockage scenario 315 to determine the transformation matrix 310.

In some examples, generating the transformation matrix 310 may be independent of (e.g., or at least relatively scarcely impacted by) antenna element indexes. Additionally, a transformation matrix 310 corresponding to a quantity N of antenna elements may, in some cases, be applied to other antenna array settings with a different quantity M of antenna array elements (e.g., at least if N and M are greater than 2). As such, to generate the transformation matrix 310, the UE 115-*e* may group a set of antennas elements (e.g., at least two antenna elements) which may not necessarily be consecutive. For example, the UE 115-*e* may group pairs of co-polar antenna elements with a reference antenna to generate a transformation matrix 310 associated with the pair of antenna elements. Additionally, or alternatively, the UE 115-*d* may group co-located antenna elements (e.g., co-polar or cross-polar antenna elements) in a pair to generate a common transformation matrix 310.

The UE 115-*e* may indicate the transformation matrix 310 to a machine learning server, as described herein with reference to FIG. 2. In some examples, the indication of the transformation matrix 310 may be or include a quantization of values. For example, the indication may include a quantization of an angular transformation of the electric field matrix 305-*a*, which may be in terms of sample angles and corresponding quantized values. In some cases, the UE 115-*e* may be indicated or configured with a set of sample angles, and the UE 115-*e* may indicate the quantized values of the transformation matrix 310 corresponding to each angle of the set of sample angles. In some examples, the quantized values may correspond to values of phases associated with the transformation matrix 310 based on the sample angles. Additionally, or alternatively, the quantized values may correspond to values of gains associated with the transformation matrix 310 based on the sample angles.

By receiving the transformation matrix 310 from the UE 115-*d*, the machine learning server may generate mitigation parameters for one or more UEs 115 of a network, which may reduce time spent performing hand blockage mitigation procedures for the UEs 115. In some aspects, the computation of the transformation matrix 310 may be performed using relatively low-complexity techniques performed by respective UEs 115, which may be provided to a machine learning server to enable efficiency gains for beam management and blockage mitigation. For example, overhead and measurements performed by the UEs 115 may be reduced, which may reduce complexity associated with blockage mitigation procedures.

Figure 4:
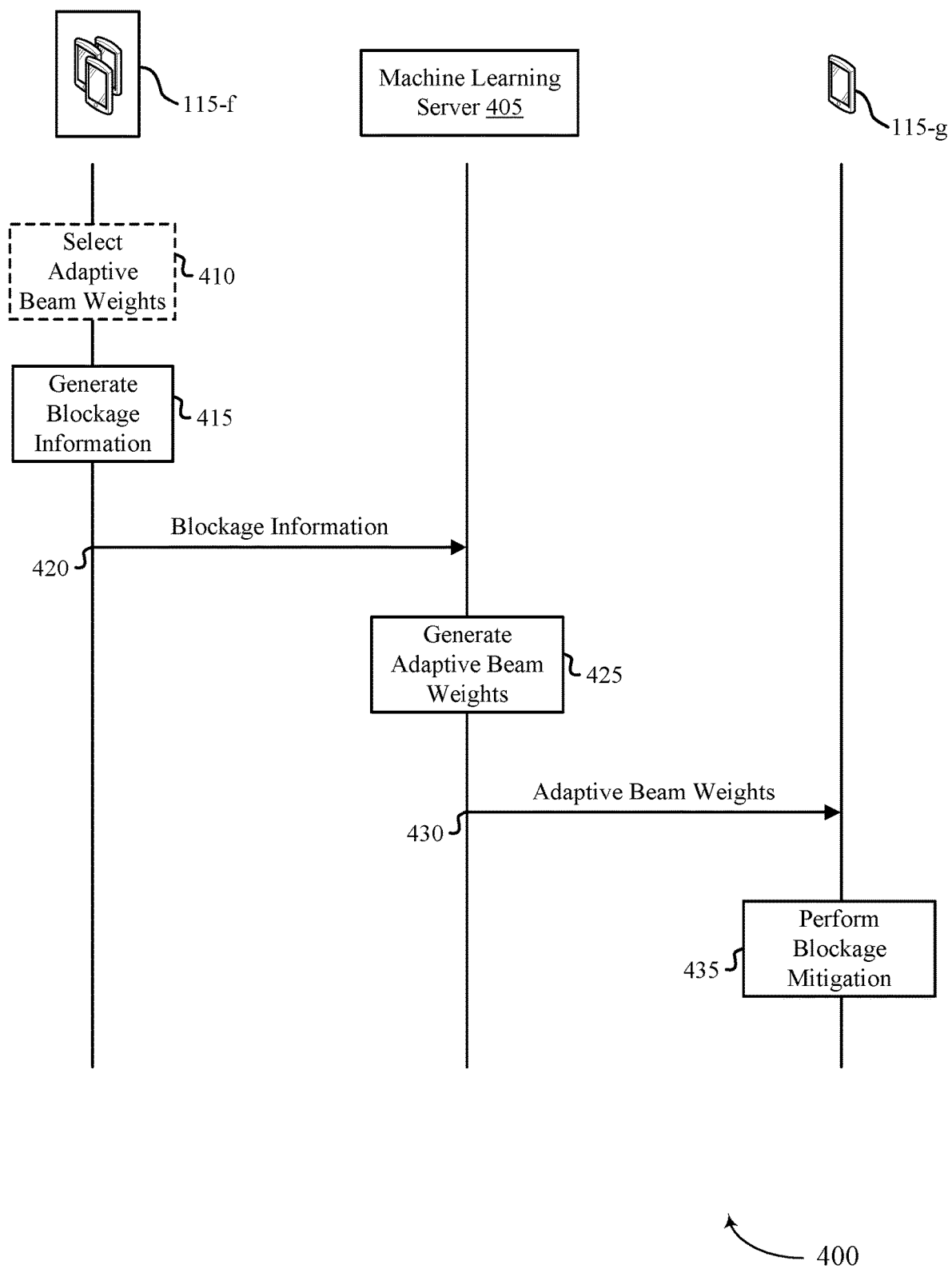
FIG. 4 illustrates an example of a process flow that supports methods for communicating training data to a machine learning server for blockage modeling and blockage mitigation in accordance with one or more aspects of the present disclosure.

FIG. 4 illustrates an example of a process flow 400 that supports methods for communicating training data to a machine learning server for blockage modeling and blockage mitigation in accordance with one or more aspects of the present disclosure. The process flow 400 may include a set of UEs 115-*f*, a machine learning server 405, and a UE 115-*g*, which may be examples of corresponding components as described herein, with reference to FIGS. 1 through 3. The set of UEs 115-*f* may include one or more UEs 115, which may be in communications with the machine learning server 405 independent of each other and may perform actions described herein at different times or in a different order. Similarly, some steps may be added, omitted, or performed in a different order with respect to the process flow 400.

At 410, the set of UEs 115-*f* (e.g., at least one UE 115 included in the set of UEs 115-*f*) may select adaptive beam weights associated with mitigation of hand blockage or body blockage. For example, a UE 115 included in the set of UEs 115-*f* may each determine one or more communication parameters (e.g., adaptive beam weights, which may correspond to amplitude control schemes or phase-only control schemes) based on one or more codebooks to adapt to the blockage and perform blockage mitigation. In some examples, a UE 115 may perform one or more measurements based on one or more reference signals, such as signal strength measurements or CIR measurements, to determine the one or more communication parameters.

At 415, the set of UEs 115-*f* (e.g., at least one UE 115 included in the set of UEs 115-*f*) may generate blockage information associated with one or more blockage scenarios. For example, a UE 115 of the set of UEs 115-*f* may generate one or more transformation matrices used for a transformation of a first electric field matrix associated with a non-blockage scenario to a second electric field matrix associated with a blockage scenario, as described herein with reference to FIGS. 2 and 3. The blockage scenario may be associated with a position of a body or hand(s) relative to one or more antenna elements of the UE 115. In some examples, the blockage information may further include hand grip properties, skin properties, (e.g., conductivity values, a dielectric constant, permittivity information, or a combination thereof) device properties (e.g., housing information, a dielectric constant, or a combination thereof), and antenna properties (e.g., antenna array geometry, antenna array dimensions, antenna module placement information, inter-antenna element spacing information, or other properties).

In some cases, the blockage information may additionally include the one or more communication parameters (e.g., adaptive beam weights) selected by a UE 115 of the set of UEs 115-*f*, as described herein with reference to FIG. 2. At 420, the set of UEs 115-*f* (e.g., at least one UE 115 included in the set of UEs 115-*f*) may transmit one or more messages indicate respective blockage information to the machine learning server 405.

At 425, the machine learning server 405 may generate one or more adaptive beam weights using on a machine learning model based on the received blockage information, as described herein with reference to FIGS. 2 and 3. For example, the machine learning server 405 may use properties associated with a blockage scenario (e.g., grip types, skin property information, or any combination thereof) and device information (e.g., antenna properties or housing properties) as inputs for the machine learning model, and the outputs for the machine learning model may comprise one or more mitigation parameters, which may include the one or more adaptive beam weights corresponding to a blockage scenario associated with the input properties.

At 430, the machine learning server 405 may transmit the one or more adaptive beam weights to the UE 115-*g*, which may be an example of a UE 115 that is newly joining (e.g., connecting to, establishing a connection with) or reconnecting to (e.g., after disruptions in communications) a network (e.g., a network associated with the machine learning server 405). In some examples, the UE 115-*g* may receive the adaptive beam weights following the UE 115-*g* joining a network associated with the machine learning server 405.

At 435, the UE 115-*g* may perform blockage mitigation based on the received one or more adaptive beam weights. In some cases, the UE 115-*g* may use the adaptive beam weights as a starting point or initial parameters for blockage mitigation. That is, the UE 115-*g* may use the adaptive beam weights to reduce or mitigate hand blockage, and the UE 115-*g* may perform measurements (e.g., of reference signals) to obtain additional or refined adaptive beam weights (e.g., based on codebooks, as described herein with reference to FIG. 2) to obtain additional (e.g., new) adaptive beam weights or refine the adaptive beam weights received from the machine learning server 405.

By receiving the adaptive beam weights from the machine learning server 405, time spent performing hand blockage mitigation procedures at the UE 115-*g* may be decreased. Likewise, by federating the blockage information from the set of UEs 115-*f*, the machine learning server 405 may acquire relatively more accurate information for generating the adaptive beam weights that are provided to UEs 115 (e.g., to UE 115-*g* or other UEs 115). Further, overhead and measurements performed by the UE 115-*g* may be reduced when performing blockage mitigation, which may reduce complexity associated with blockage mitigation procedures.

Figure 5:
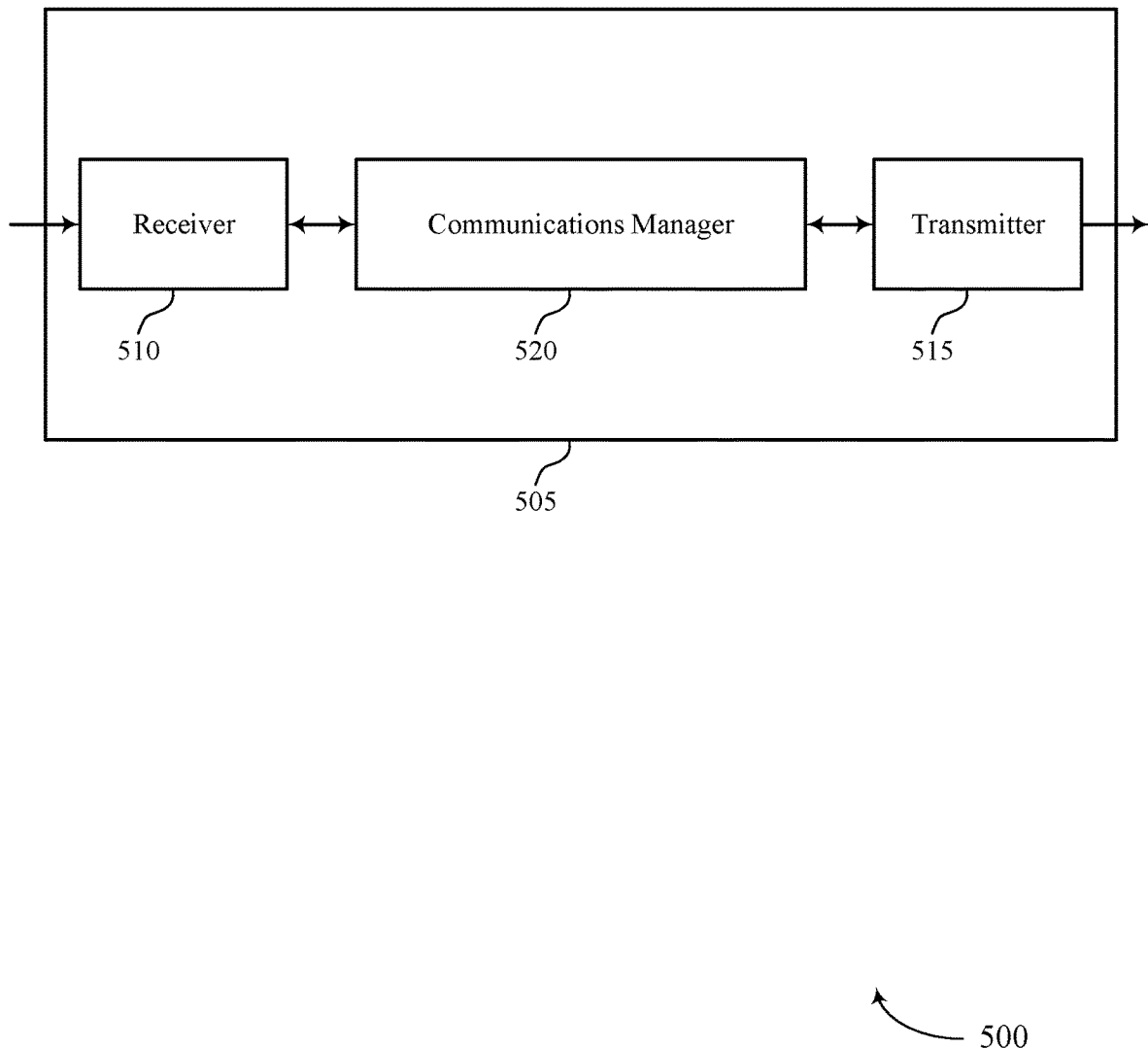
FIGS. 5 and 6 illustrate block diagrams of devices that support methods for communicating training data to a machine learning server for blockage modeling and blockage mitigation in accordance with one or more aspects of the present disclosure.

FIG. 5 illustrates a block diagram 500 of a device 505 that supports methods for communicating training data to a machine learning server for blockage modeling and blockage mitigation in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to methods for communicating training data to a machine learning server for blockage modeling and blockage mitigation). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to methods for communicating training data to a machine learning server for blockage modeling and blockage mitigation). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of methods for communicating training data to a machine learning server for blockage modeling and blockage mitigation as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), a graphics processing unit (GPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code or software (e.g., as communications management software) executed by a processor. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in code executed by a processor, the functions of the communications manager 520, the receiver 510, the transmitter 515, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for generating blockage transformation information associated with one or more blockage scenarios based on one or more adaptive beam weights used for blockage mitigation at the UE, the one or more blockage scenarios associated with respective positions of a body or hand relative to one or more antennas of the UE, where the blockage transformation information includes an indication of a transformation matrix used for a transformation of a first electric field matrix associated with a non-blockage scenario to a second electric field matrix associated with a blockage scenario. The communications manager 520 may be configured as or otherwise support a means for transmitting, to a machine learning server, a message indicating the blockage transformation information based on generating the blockage transformation information.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for hand or body blockage mitigation with reduced processing and more efficient utilization of communication resources.

Figure 6:
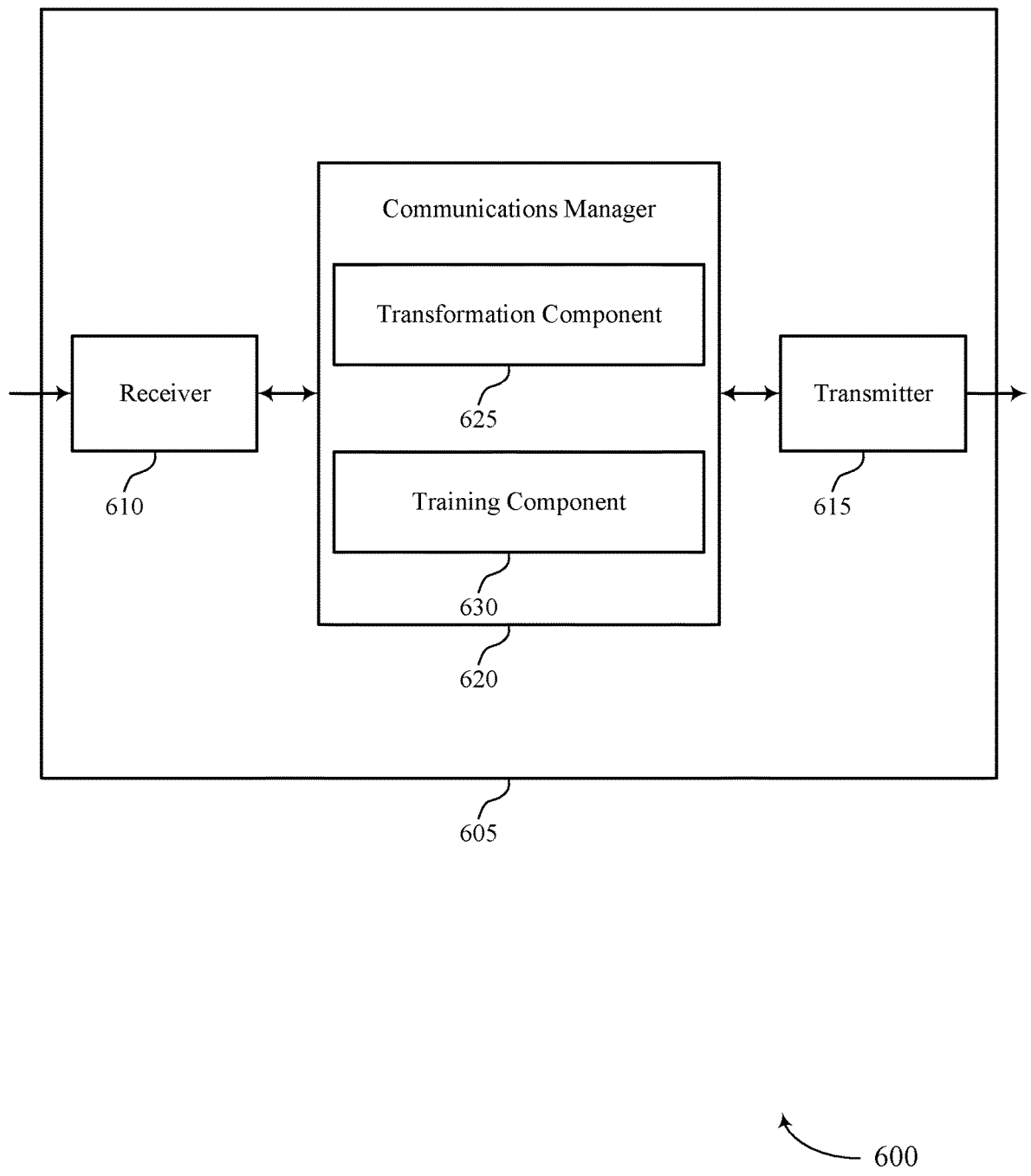

FIG. 6 illustrates a block diagram 600 of a device 605 that supports methods for communicating training data to a machine learning server for blockage modeling and blockage mitigation in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to methods for communicating training data to a machine learning server for blockage modeling and blockage mitigation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to methods for communicating training data to a machine learning server for blockage modeling and blockage mitigation). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of methods for communicating training data to a machine learning server for blockage modeling and blockage mitigation as described herein. For example, the communications manager 620 may include a transformation component 625 a training component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The transformation component 625 may be configured as or otherwise support a means for generating blockage transformation information associated with one or more blockage scenarios based on one or more adaptive beam weights used for blockage mitigation at the UE, the one or more blockage scenarios associated with respective positions of a body or hand relative to one or more antennas of the UE, where the blockage transformation information includes an indication of a transformation matrix used for a transformation of a first electric field matrix associated with a non-blockage scenario to a second electric field matrix associated with a blockage scenario. The training component 630 may be configured as or otherwise support a means for transmitting, to a machine learning server, a message indicating the blockage transformation information based on generating the blockage transformation information.

Figure 7:
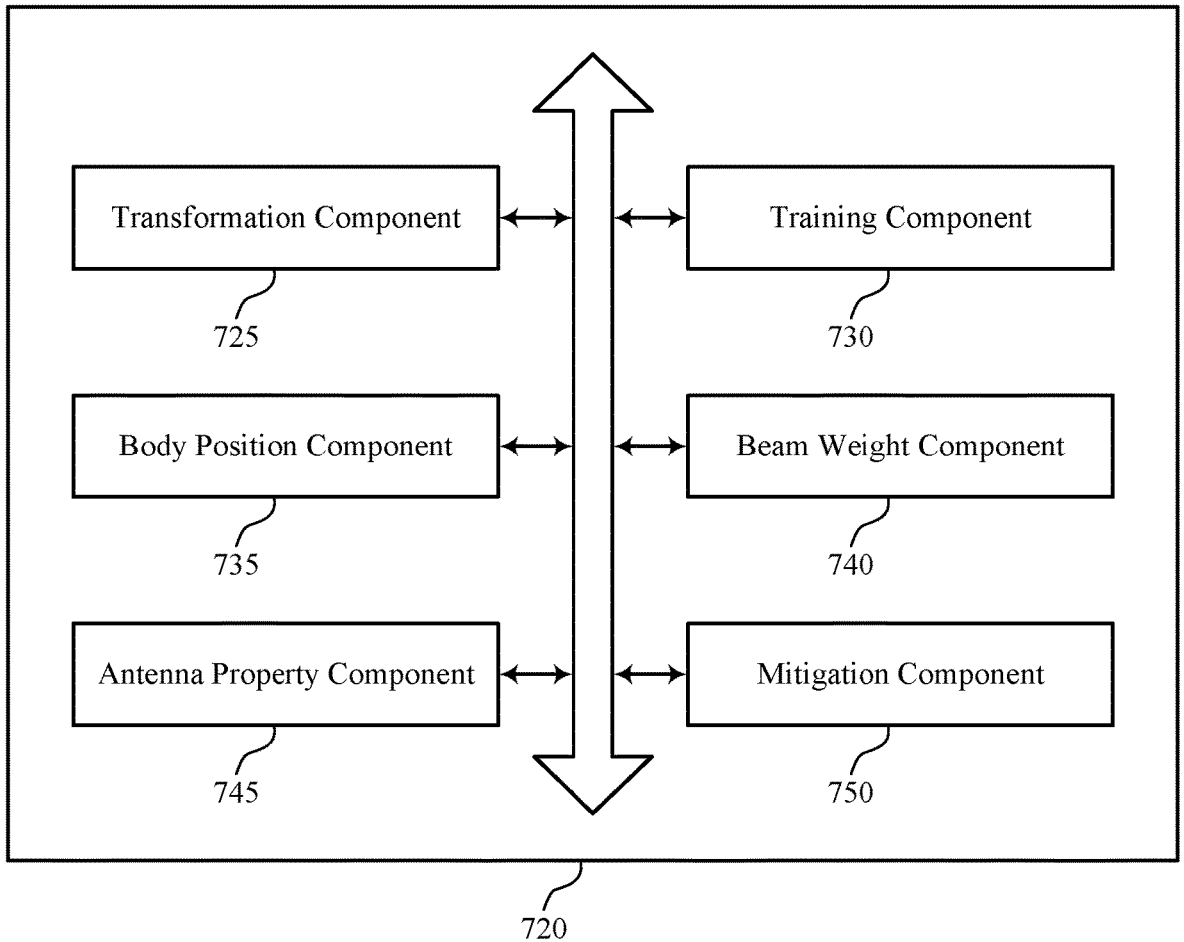
FIG. 7 illustrates a block diagram of a communications manager that supports methods for communicating training data to a machine learning server for blockage modeling and blockage mitigation in accordance with one or more aspects of the present disclosure.

FIG. 7 illustrates a block diagram 700 of a communications manager 720 that supports methods for communicating training data to a machine learning server for blockage modeling and blockage mitigation in accordance with one or more aspects of the present disclosure. The communications manager 720 may be an example of aspects of a communications manager 520, a communications manager 620, or both, as described herein. The communications manager 720, or various components thereof, may be an example of means for performing various aspects of methods for communicating training data to a machine learning server for blockage modeling and blockage mitigation as described herein. For example, the communications manager 720 may include a transformation component 725, a training component 730, a body position component 735, a beam weight component 740, an antenna property component 745, a mitigation component 750, or any combination thereof. Each of these components may communicate, directly or indirectly, with one another (e.g., via one or more buses).

The communications manager 720 may support wireless communication at a UE in accordance with examples as disclosed herein. The transformation component 725 may be configured as or otherwise support a means for generating blockage transformation information associated with one or more blockage scenarios based on one or more adaptive beam weights used for blockage mitigation at the UE, the one or more blockage scenarios associated with respective positions of a body or hand relative to one or more antennas of the UE, where the blockage transformation information includes an indication of a transformation matrix used for a transformation of a first electric field matrix associated with a non-blockage scenario to a second electric field matrix associated with a blockage scenario. The training component 730 may be configured as or otherwise support a means for transmitting, to a machine learning server, a message indicating the blockage transformation information based on generating the blockage transformation information.

In some examples, the body position component 735 may be configured as or otherwise support a means for transmitting, to the machine learning server, an indication of blockage information corresponding to blockage caused by a position of the body or hand relative to the one or more antennas.

In some examples, the blockage information includes one or both of hand grip information or skin properties, the skin properties including a conductivity value, a dielectric constant, permittivity information, or a combination thereof. In some examples, the blockage transformation information corresponds to the one or more blockage scenarios based on the blockage information.

In some examples, the beam weight component 740 may be configured as or otherwise support a means for selecting the one or more adaptive beam weights for the blockage mitigation based on one or more codebooks configured at the UE. In some examples, the transformation component 725 may be configured as or otherwise support a means for transmitting, to the machine learning server, an indication of the one or more adaptive beam weights associated with the blockage mitigation at the UE.

In some examples, the antenna property component 745 may be configured as or otherwise support a means for transmitting, to the machine learning server, an indication of antenna properties associated with the one or more antennas of the UE.

In some examples, the antenna properties include antenna array geometry, antenna array dimensions, antenna module placement, inter-antenna element spacing information, housing properties, a dielectric constant, or any combination thereof.

In some examples, the transformation component 725 may be configured as or otherwise support a means for performing, for each antenna element of the one or more antennas of the UE, a transformation of data from the first electric field matrix associated with the non-blockage scenario to data from the second electric field matrix associated with the blockage scenario, where the blockage transformation information is generated based on performing the transformation.

In some examples, the blockage transformation information corresponds to a quantization of information associated with the transformation, the quantization of information including a quantization of one or more sample angles and one or more quantized values of phases or gains.

In some examples, the beam weight component 740 may be configured as or otherwise support a means for receiving, from a network entity, a control message including a second set of adaptive beam weights for blockage mitigation in response to joining a network, where the second set of adaptive beam weights is based on one or more machine learning functions. In some examples, the mitigation component 750 may be configured as or otherwise support a means for performing a blockage mitigation procedure based on the second set of adaptive beam weights. In some examples, the one or more adaptive beam weights include a set of multiple adaptive beam weights associated with a respective hand or body blockage scenario.

In some examples, the first electric field matrix represents a polarized set of electric fields across a set of multiple antenna elements at the UE associated with the non-blockage scenario and the second electric field matrix represents a polarized set of electric fields across the set of multiple antenna elements at the UE associated with the blockage scenario.

Figure 8:
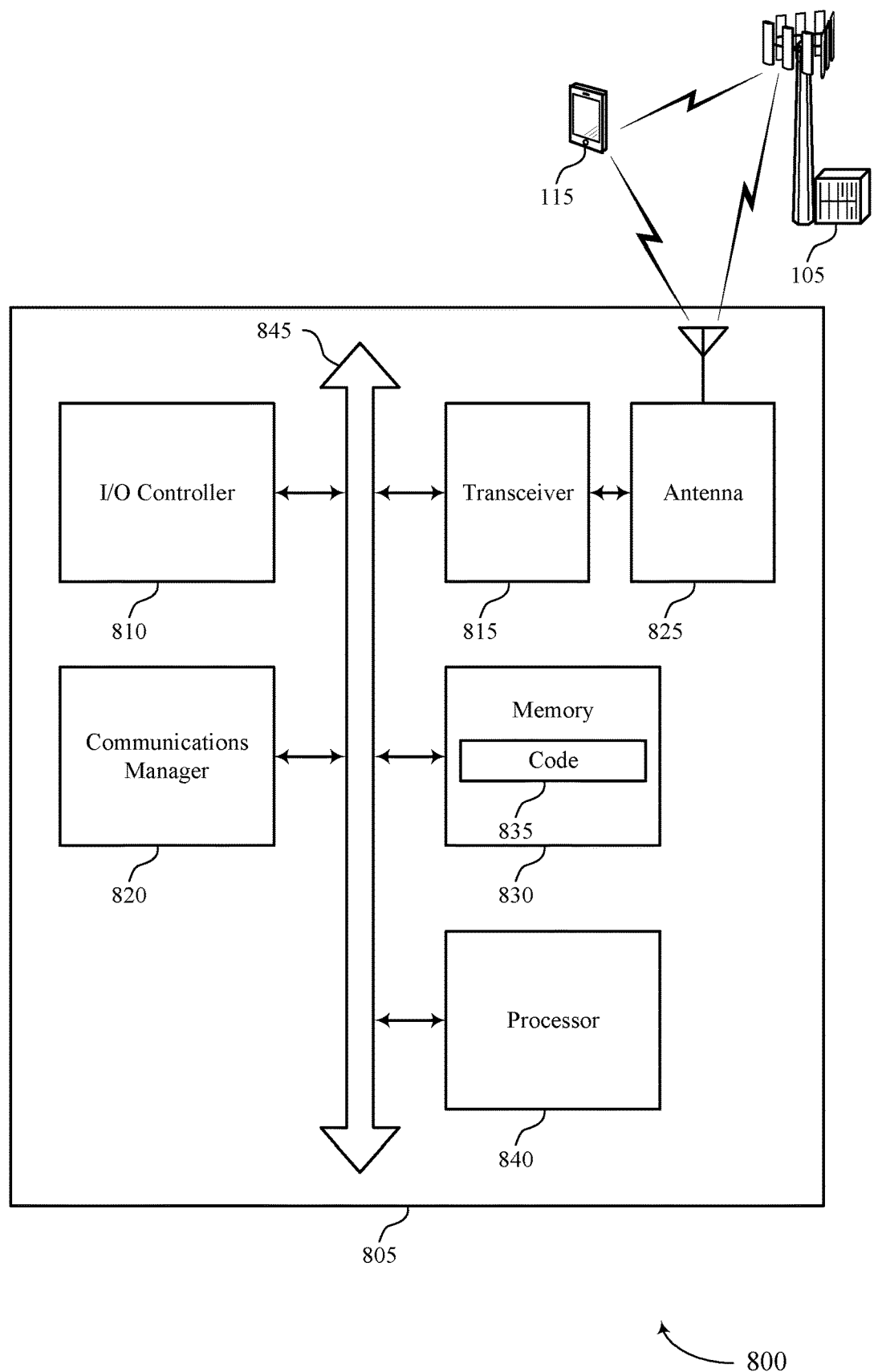
FIG. 8 illustrates a diagram of a system including a device that supports methods for communicating training data to a machine learning server for blockage modeling and blockage mitigation in accordance with one or more aspects of the present disclosure.

FIG. 8 illustrates a diagram of a system 800 including a device 805 that supports methods for communicating training data to a machine learning server for blockage modeling and blockage mitigation in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting methods for communicating training data to a machine learning server for blockage modeling and blockage mitigation). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for generating blockage transformation information associated with one or more blockage scenarios based on one or more adaptive beam weights used for blockage mitigation at the UE, the one or more blockage scenarios associated with respective positions of a body or hand relative to one or more antennas of the UE, where the blockage transformation information includes an indication of a transformation matrix used for a transformation of a first electric field matrix associated with a non-blockage scenario to a second electric field matrix associated with a blockage scenario. The communications manager 820 may be configured as or otherwise support a means for transmitting, to a machine learning server, a message indicating the blockage transformation information based on generating the blockage transformation information.

By including or configuring the communications manager 820 in accordance with examples as described herein, the device 805 may support techniques for hand or body blockage mitigation with increased battery life and more efficient utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of methods for communicating training data to a machine learning server for blockage modeling and blockage mitigation as described herein, or the processor 840 and the memory 830 may be otherwise configured to perform or support such operations.

Figure 9:
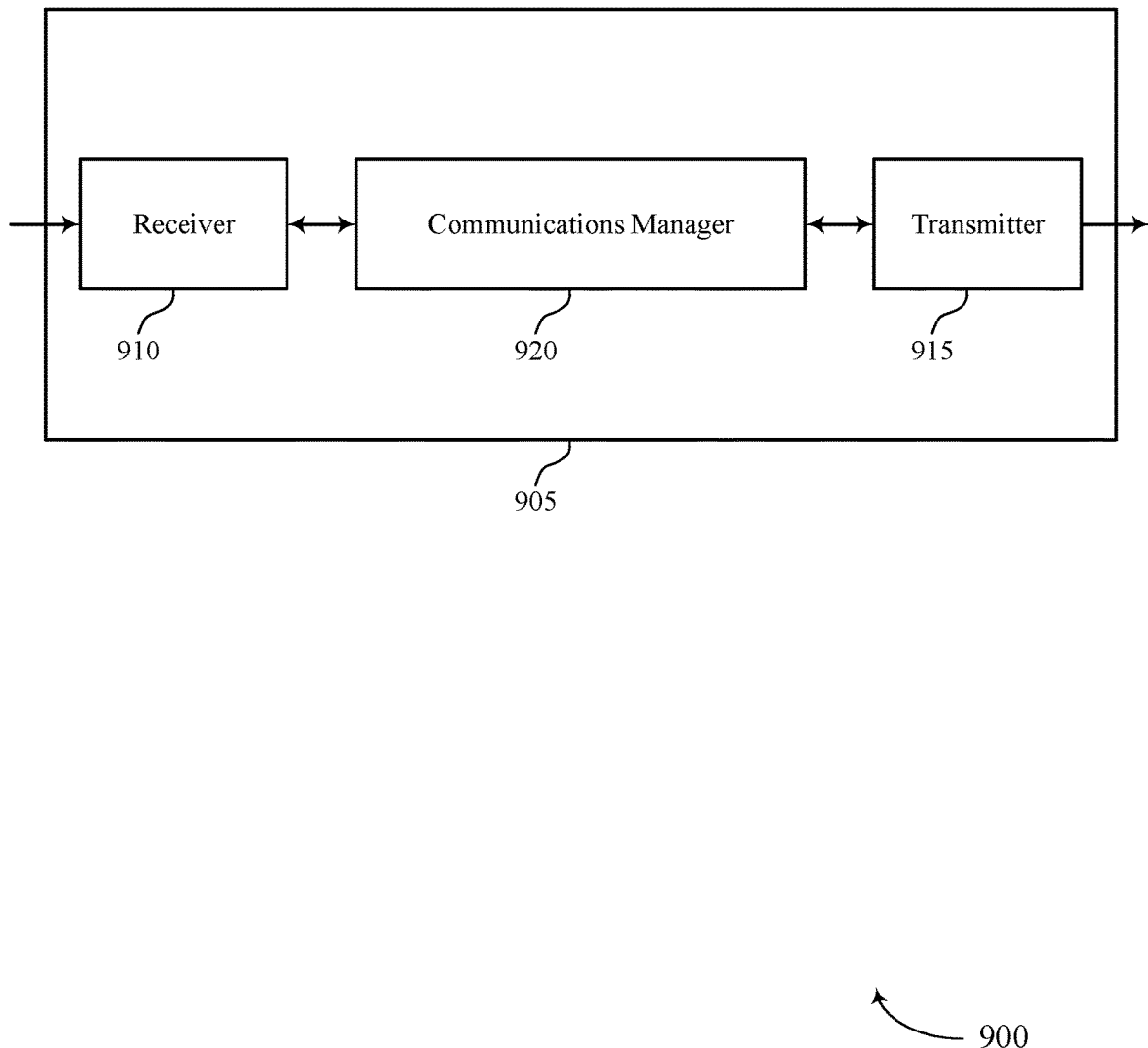
FIGS. 9 and 10 illustrate block diagrams of devices that support methods for communicating training data to a machine learning server for blockage modeling and blockage mitigation in accordance with one or more aspects of the present disclosure.

FIG. 9 illustrates a block diagram 900 of a device 905 that supports methods for communicating training data to a machine learning server for blockage modeling and blockage mitigation in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of methods for communicating training data to a machine learning server for blockage modeling and blockage mitigation as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, a GPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software) executed by a processor. If implemented in code executed by a processor, the functions of the communications manager 920, the receiver 910, the transmitter 915, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication in accordance with examples as disclosed herein. For example, the communications manager 920 may be configured as or otherwise support a means for receiving, from a set of multiple UEs, respective messages that each indicate blockage transformation information associated with one or more blockage scenarios at a respective UE of the set of multiple UEs, the one or more blockage scenarios associated with a position of a respective body or hand relative to one or more antennas of the respective UE. The communications manager 920 may be configured as or otherwise support a means for generating a set of adaptive beam weights using a machine learning model based on the blockage transformation information. The communications manager 920 may be configured as or otherwise support a means for transmitting, to a first UE, the set of adaptive beam weights for blockage mitigation at the first UE based on generating the set of adaptive beam weights.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for hand or body blockage mitigation with reduced processing and more efficient utilization of communication resources.

Figure 10:
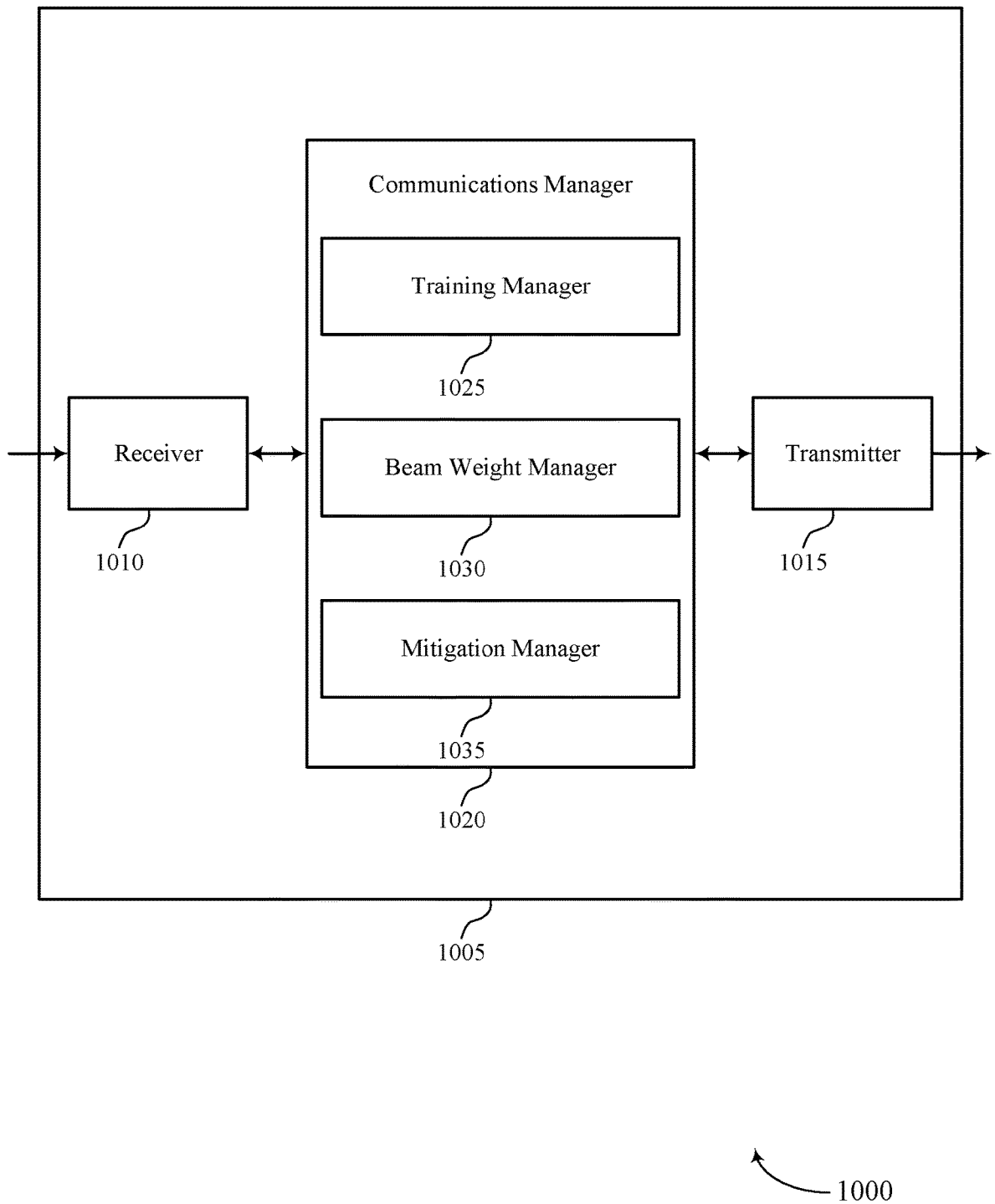

FIG. 10 illustrates a block diagram 1000 of a device 1005 that supports methods for communicating training data to a machine learning server for blockage modeling and blockage mitigation in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of methods for communicating training data to a machine learning server for blockage modeling and blockage mitigation as described herein. For example, the communications manager 1020 may include a training manager 1025, a beam weight manager 1030, a mitigation manager 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication in accordance with examples as disclosed herein. The training manager 1025 may be configured as or otherwise support a means for receiving, from a set of multiple UEs, respective messages that each indicate blockage transformation information associated with one or more blockage scenarios at a respective UE of the set of multiple UEs, the one or more blockage scenarios associated with a position of a respective body or hand relative to one or more antennas of the respective UE. The beam weight manager 1030 may be configured as or otherwise support a means for generating a set of adaptive beam weights using a machine learning model based on the blockage transformation information. The mitigation manager 1035 may be configured as or otherwise support a means for transmitting, to a first UE, the set of adaptive beam weights for blockage mitigation at the first UE based on generating the set of adaptive beam weights.

Figure 11:
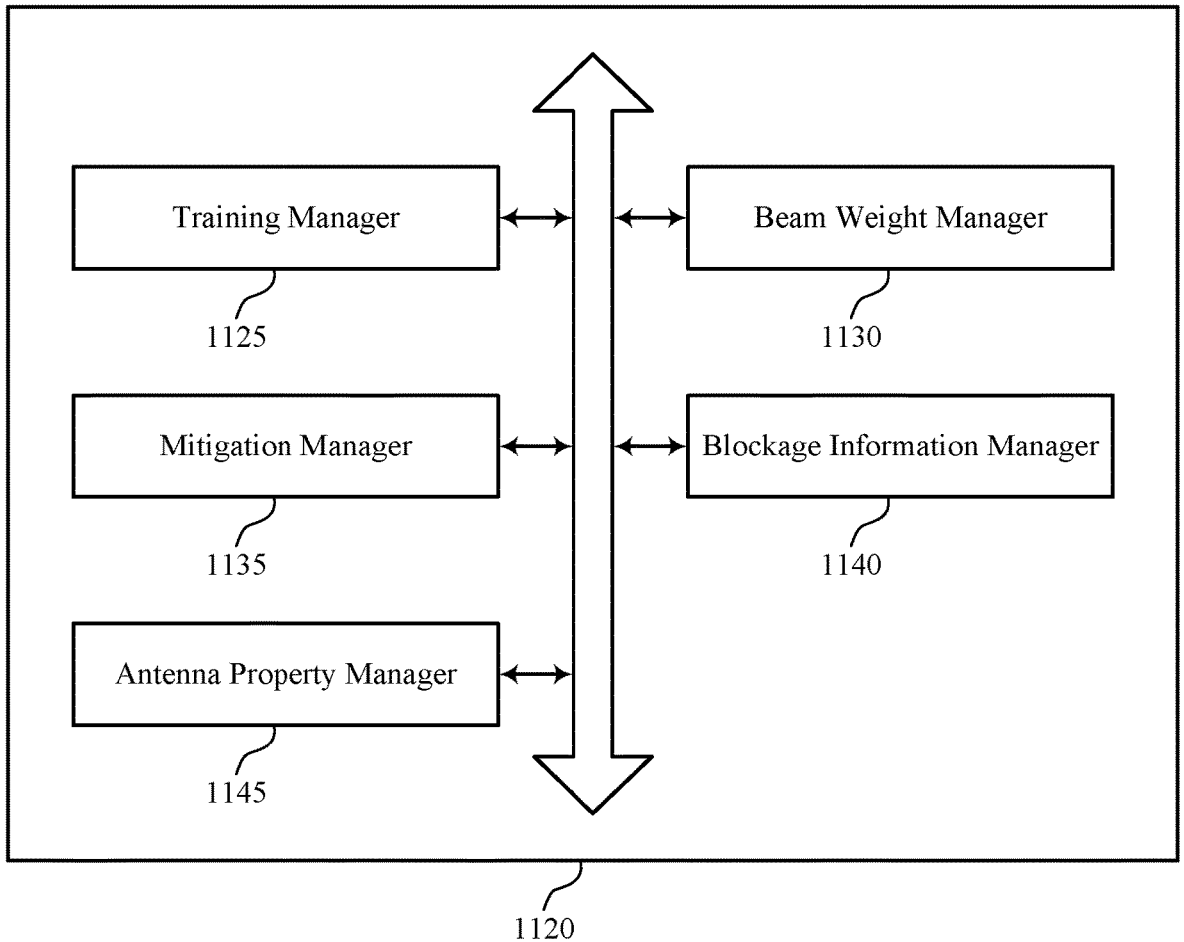
FIG. 11 illustrates a block diagram of a communications manager that supports methods for communicating training data to a machine learning server for blockage modeling and blockage mitigation in accordance with one or more aspects of the present disclosure.

FIG. 11 illustrates a block diagram 1100 of a communications manager 1120 that supports methods for communicating training data to a machine learning server for blockage modeling and blockage mitigation in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of methods for communicating training data to a machine learning server for blockage modeling and blockage mitigation as described herein. For example, the communications manager 1120 may include a training manager 1125, a beam weight manager 1130, a mitigation manager 1135, a blockage information manager 1140, an antenna property manager 1145, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication in accordance with examples as disclosed herein. The training manager 1125 may be configured as or otherwise support a means for receiving, from a set of multiple UEs, respective messages that each indicate blockage transformation information associated with one or more blockage scenarios at a respective UE of the set of multiple UEs, the one or more blockage scenarios associated with a position of a respective body or hand relative to one or more antennas of the respective UE. The beam weight manager 1130 may be configured as or otherwise support a means for generating a set of adaptive beam weights using a machine learning model based on the blockage transformation information. The mitigation manager 1135 may be configured as or otherwise support a means for transmitting, to a first UE, the set of adaptive beam weights for blockage mitigation at the first UE based on generating the set of adaptive beam weights.

In some examples, the blockage information manager 1140 may be configured as or otherwise support a means for receiving, from the set of multiple UEs, respective indications of blockage information corresponding to blockage caused by a position of the respective body or hand relative to the one or more antennas of the respective UE, where generating the set of adaptive beam weights using the machine learning model is based on the blockage information.

In some examples, the blockage information includes one or both of hand grip information or skin properties, the skin properties including a conductivity value, a dielectric constant, permittivity information, or a combination thereof.

In some examples, the blockage transformation information corresponds to one or more blockage scenarios based on the blockage information.

In some examples, the beam weight manager 1130 may be configured as or otherwise support a means for receiving, from the set of multiple UEs, respective indications of adaptive beam weights associated with the blockage mitigation at the set of multiple UEs, where generating the set of adaptive beam weights using the machine learning model is based on the adaptive beam weights associated with the blockage mitigation at the set of multiple UEs.

In some examples, the antenna property manager 1145 may be configured as or otherwise support a means for receiving, from the set of multiple UEs, respective indications of antenna properties associated with the set of multiple UEs, where generating the set of adaptive beam weights using the machine learning model is based on the antenna properties.

In some examples, the antenna properties include antenna array geometry, antenna array dimensions, antenna module placement, inter-antenna element spacing, housing properties, or any combination thereof.

In some examples, the blockage transformation information includes a transformation matrix for a transformation of a first matrix of electric fields associated with a non-blockage scenario to a second matrix of electric fields associated with a blockage scenario.

In some examples, the first matrix represents a polarized set of electric fields across a set of multiple antenna elements at a respective UE of the set of multiple UEs and associated with the non-blockage scenario and the second matrix represents a polarized set of electric fields across the set of multiple antenna elements at the respective UE and associated with the blockage scenario.

In some examples, the blockage transformation information corresponds to a quantization of information associated with respective transformations by the set of multiple UEs, the quantization of information including a quantization of one or more sample angles and one or more quantized values of phases or gains.

In some examples, the set of adaptive beam weights is transmitted to the first UE in response to the first UE joining a network.

In some examples, the set of adaptive beam weights includes a set of multiple adaptive beam weights associated with a respective hand blockage scenario.

Figure 12:
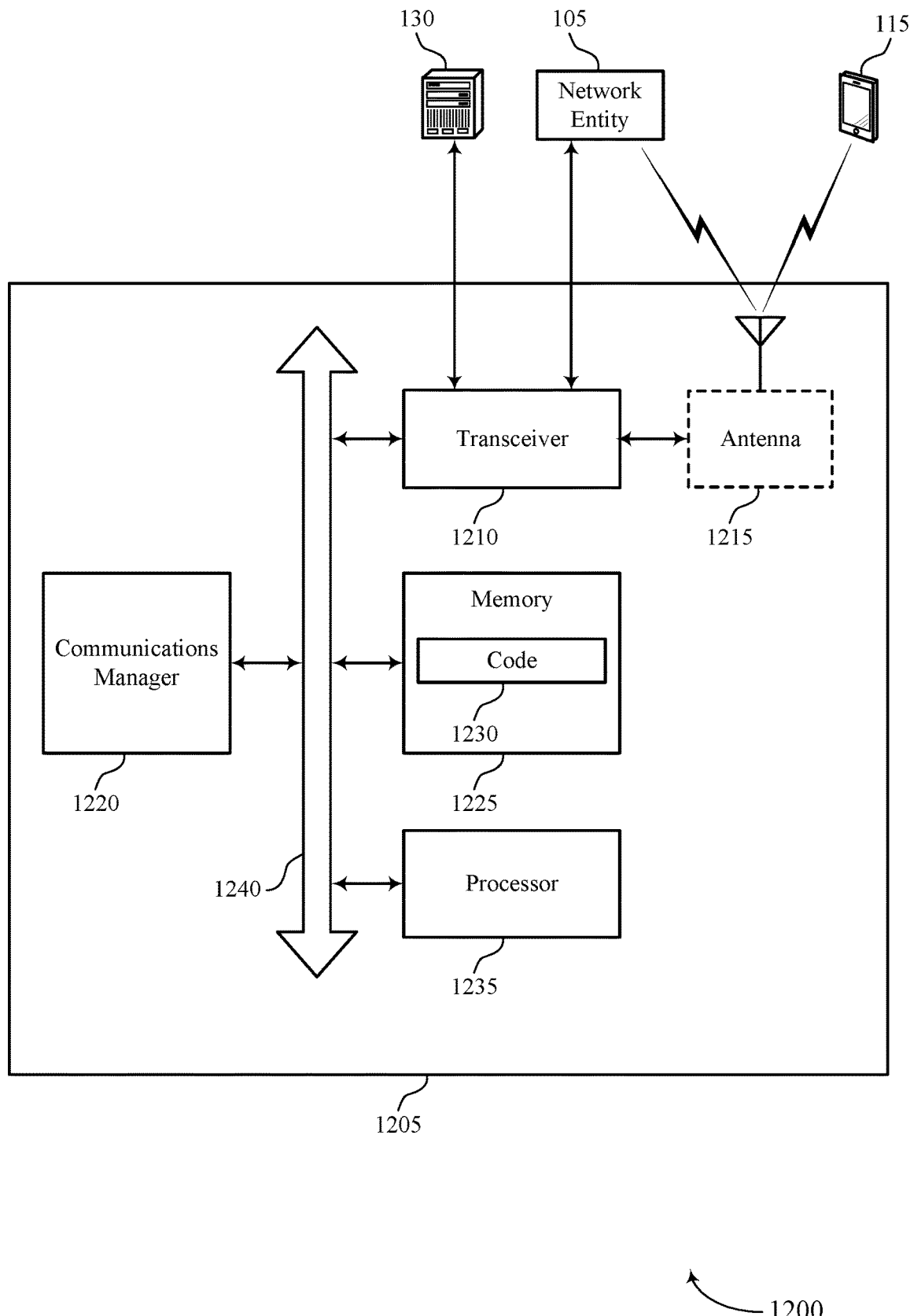
FIG. 12 illustrates a diagram of a system including a device that supports methods for communicating training data to a machine learning server for blockage modeling and blockage mitigation in accordance with one or more aspects of the present disclosure.

FIG. 12 illustrates a diagram of a system 1200 including a device 1205 that supports methods for communicating training data to a machine learning server for blockage modeling and blockage mitigation in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, a GPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting methods for communicating training data to a machine learning server for blockage modeling and blockage mitigation). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication in accordance with examples as disclosed herein. For example, the communications manager 1220 may be configured as or otherwise support a means for receiving, from a set of multiple UEs, respective messages that each indicate blockage transformation information associated with one or more blockage scenarios at a respective UE of the set of multiple UEs, the one or more blockage scenarios associated with a position of a respective body or hand relative to one or more antennas of the respective UE. The communications manager 1220 may be configured as or otherwise support a means for generating a set of adaptive beam weights using a machine learning model based on the blockage transformation information. The communications manager 1220 may be configured as or otherwise support a means for transmitting, to a first UE, the set of adaptive beam weights for blockage mitigation at the first UE based on generating the set of adaptive beam weights.

By including or configuring the communications manager 1220 in accordance with examples as described herein, the device 1205 may support techniques for hand or body blockage mitigation with increased battery life and more efficient utilization of processing capability.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of methods for communicating training data to a machine learning server for blockage modeling and blockage mitigation as described herein, or the processor 1235 and the memory 1225 may be otherwise configured to perform or support such operations.

Figure 13:
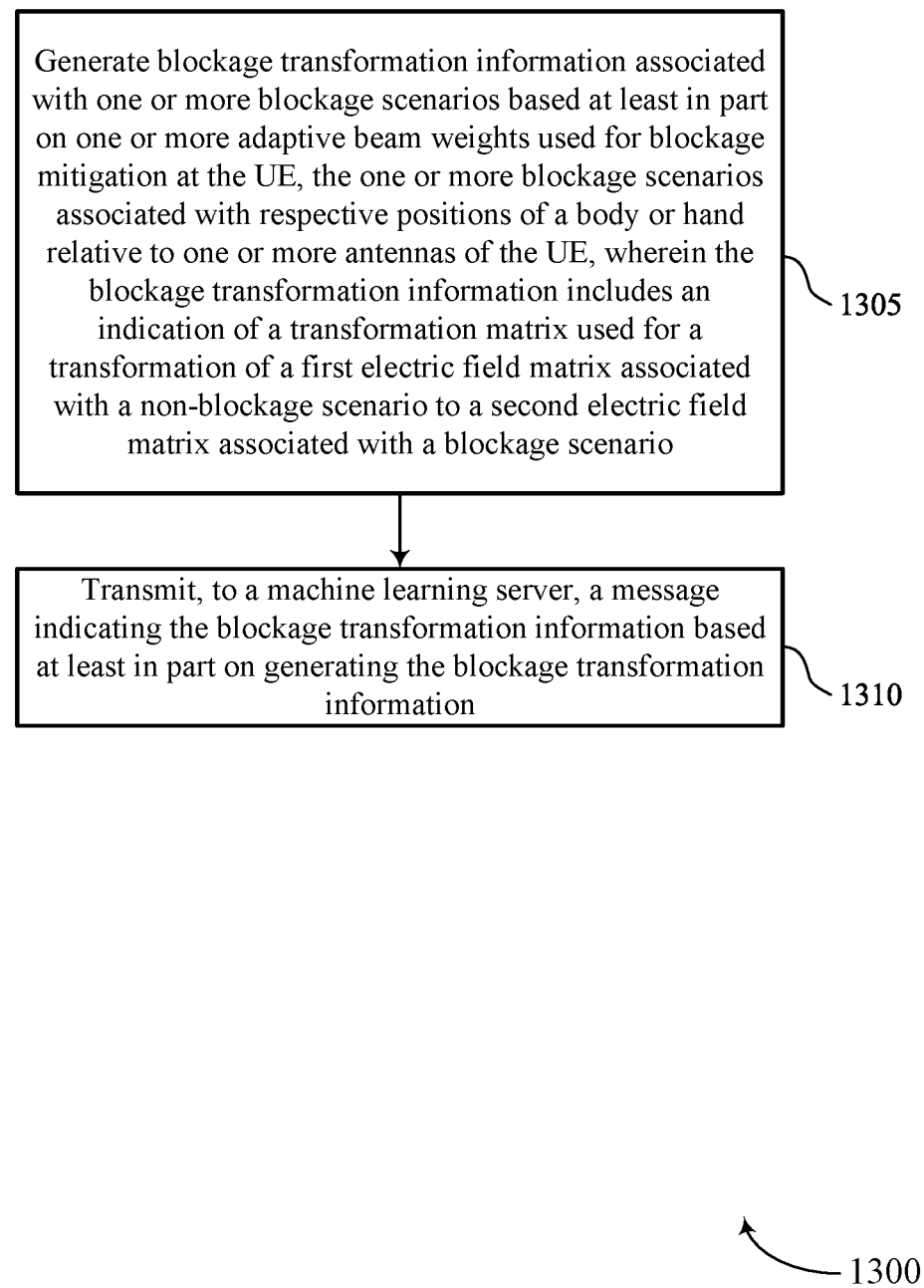
FIGS. 13 through 16 illustrate flowcharts showing methods that support methods for communicating training data to a machine learning server for blockage modeling and blockage mitigation in accordance with one or more aspects of the present disclosure.

FIG. 13 illustrates a flowchart showing a method 1300 that supports methods for communicating training data to a machine learning server for blockage modeling and blockage mitigation in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include generating blockage transformation information associated with one or more blockage scenarios based at least in part on one or more adaptive beam weights used for blockage mitigation at the UE, the one or more blockage scenarios associated with respective positions of a body or hand relative to one or more antennas of the UE, where the blockage transformation information includes an indication of a transformation matrix used for a transformation of a first electric field matrix associated with a non-blockage scenario to a second electric field matrix associated with a blockage scenario. The operations of 1305 may be performed in accordance with examples as disclosed herein. In some examples, aspects of the operations of 1305 may be performed by a transformation component 725 as described with reference to FIG. 7.

At 1310, the method may include transmitting, to a machine learning server, a message indicating the blockage transformation information based at least in part on generating the blockage transformation information. The operations of 1310 may be performed in accordance with examples as disclosed herein. In some examples, aspects of the operations of 1310 may be performed by a training component 730 as described with reference to FIG. 7.

Figure 14:
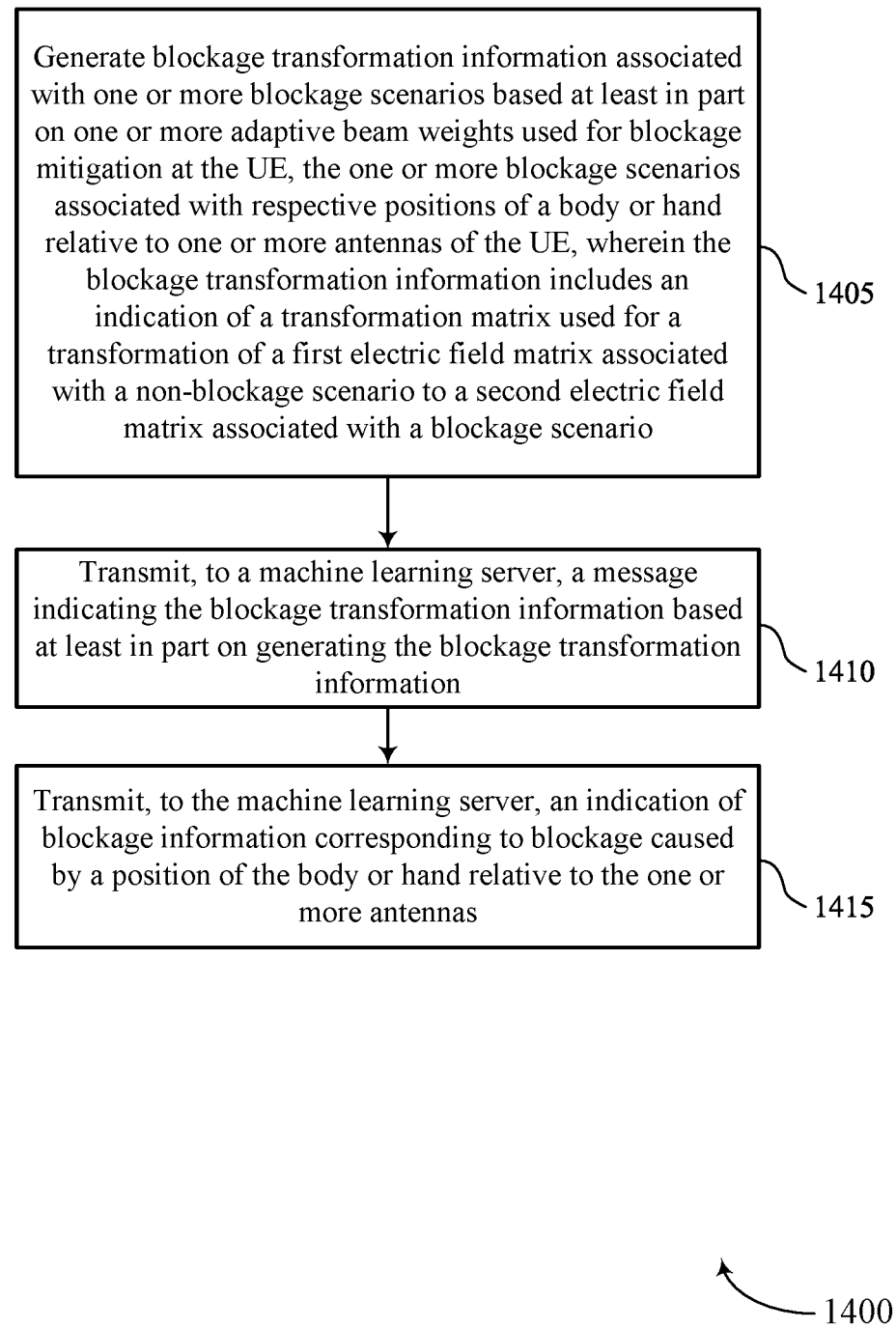

FIG. 14 illustrates a flowchart showing a method 1400 that supports methods for communicating training data to a machine learning server for blockage modeling and blockage mitigation in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include generating blockage transformation information associated with one or more blockage scenarios based at least in part on one or more adaptive beam weights used for blockage mitigation at the UE, the one or more blockage scenarios associated with respective positions of a body or hand relative to one or more antennas of the UE, where the blockage transformation information includes an indication of a transformation matrix used for a transformation of a first electric field matrix associated with a non-blockage scenario to a second electric field matrix associated with a blockage scenario. The operations of 1405 may be performed in accordance with examples as disclosed herein. In some examples, aspects of the operations of 1405 may be performed by a transformation component 725 as described with reference to FIG. 7.

At 1410, the method may include transmitting, to a machine learning server, a message indicating the blockage transformation information based at least in part on generating the blockage transformation information. The operations of 1410 may be performed in accordance with examples as disclosed herein. In some examples, aspects of the operations of 1410 may be performed by a training component 730 as described with reference to FIG. 7.

At 1415, the method may include transmitting, to the machine learning server, an indication of blockage information corresponding to blockage caused by a position of the body or hand relative to the one or more antennas. The operations of 1415 may be performed in accordance with examples as disclosed herein. In some examples, aspects of the operations of 1415 may be performed by a body position component 735 as described with reference to FIG. 7.

Figure 15:
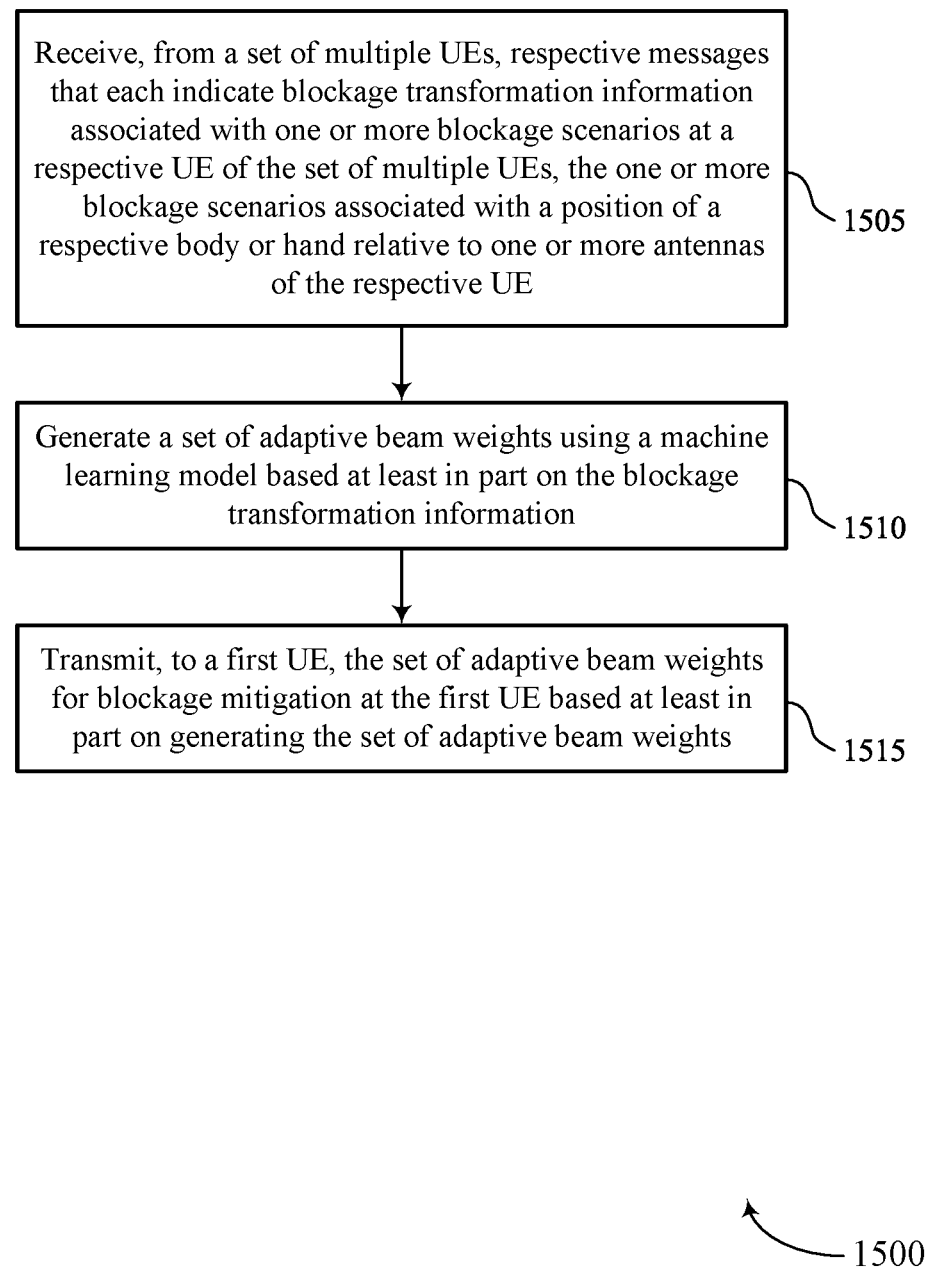

FIG. 15 illustrates a flowchart showing a method 1500 that supports methods for communicating training data to a machine learning server for blockage modeling and blockage mitigation in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include receiving, from a set of multiple UEs, respective messages that each indicate blockage transformation information associated with one or more blockage scenarios at a respective UE of the set of multiple UEs, the one or more blockage scenarios associated with a position of a respective body or hand relative to one or more antennas of the respective UE. The operations of 1505 may be performed in accordance with examples as disclosed herein. In some examples, aspects of the operations of 1505 may be performed by a training manager 1125 as described with reference to FIG. 11.

At 1510, the method may include generating a set of adaptive beam weights using a machine learning model based at least in part on the blockage transformation information. The operations of 1510 may be performed in accordance with examples as disclosed herein. In some examples, aspects of the operations of 1510 may be performed by a beam weight manager 1130 as described with reference to FIG. 11.

At 1515, the method may include transmitting, to a first UE, the set of adaptive beam weights for blockage mitigation at the first UE based at least in part on generating the set of adaptive beam weights. The operations of 1515 may be performed in accordance with examples as disclosed herein. In some examples, aspects of the operations of 1515 may be performed by a mitigation manager 1135 as described with reference to FIG. 11.

Figure 16:
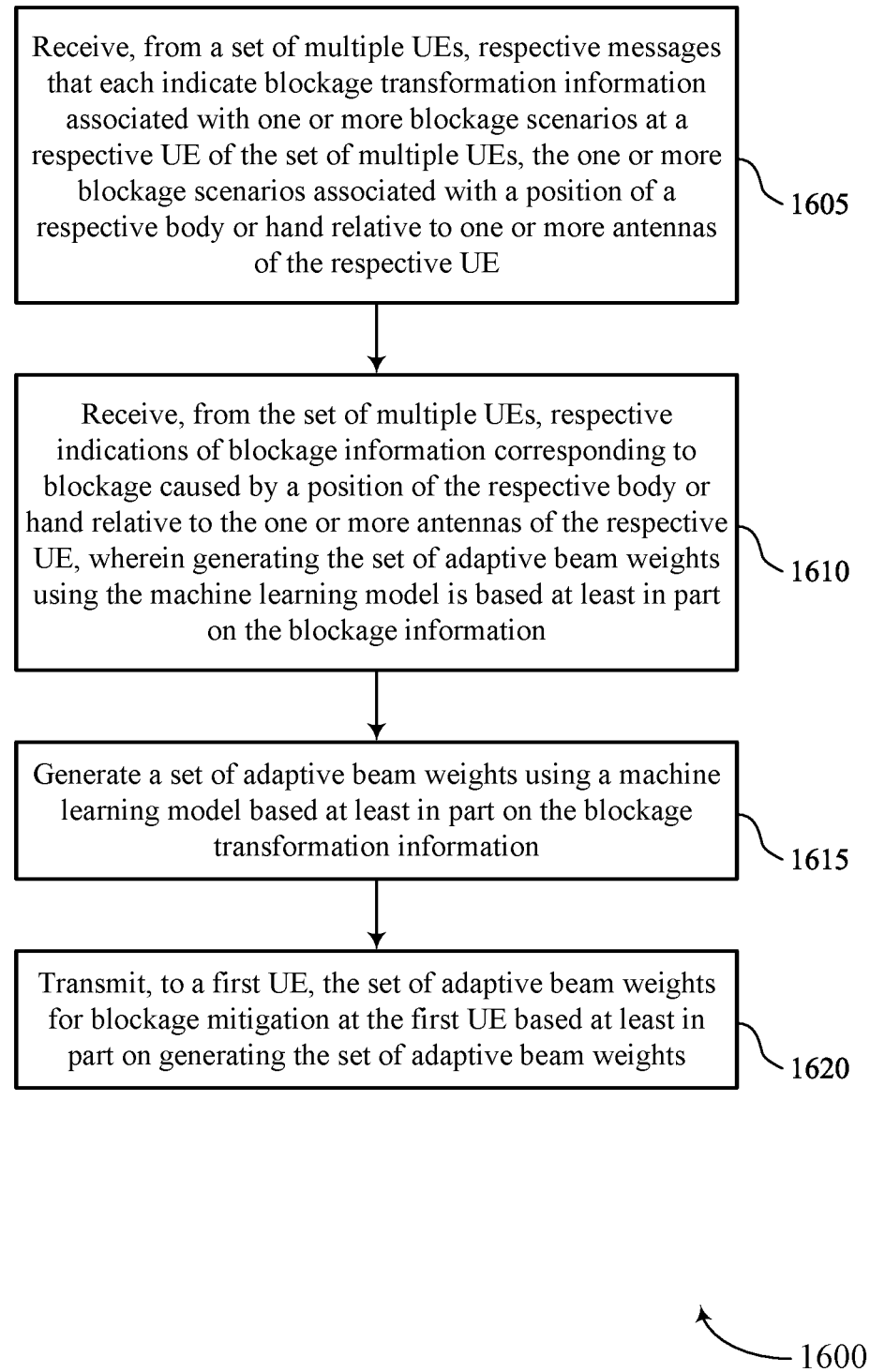

FIG. 16 illustrates a flowchart showing a method 1600 that supports methods for communicating training data to a machine learning server for blockage modeling and blockage mitigation in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include receiving, from a set of multiple UEs, respective messages that each indicate blockage transformation information associated with one or more blockage scenarios at a respective UE of the set of multiple UEs, the one or more blockage scenarios associated with a position of a respective body or hand relative to one or more antennas of the respective UE. The operations of 1605 may be performed in accordance with examples as disclosed herein. In some examples, aspects of the operations of 1605 may be performed by a training manager 1125 as described with reference to FIG. 11.

At 1610, the method may include receiving, from the set of multiple UEs, respective indications of blockage information corresponding to blockage caused by a position of the respective body or hand relative to the one or more antennas of the respective UE, where generating the set of adaptive beam weights using the machine learning model is based at least in part on the blockage information. The operations of 1610 may be performed in accordance with examples as disclosed herein. In some examples, aspects of the operations of 1610 may be performed by a blockage information manager 1140 as described with reference to FIG. 11.

At 1615, the method may include generating a set of adaptive beam weights using a machine learning model based at least in part on the blockage transformation information. The operations of 1615 may be performed in accordance with examples as disclosed herein. In some examples, aspects of the operations of 1615 may be performed by a beam weight manager 1130 as described with reference to FIG. 11.

At 1620, the method may include transmitting, to a first UE, the set of adaptive beam weights for blockage mitigation at the first UE based at least in part on generating the set of adaptive beam weights. The operations of 1620 may be performed in accordance with examples as disclosed herein. In some examples, aspects of the operations of 1620 may be performed by a mitigation manager 1135 as described with reference to FIG. 11.

The following provides an overview of aspects of the present disclosure:

Aspect 1: A method for wireless communication at a UE, comprising: generating blockage transformation information associated with one or more blockage scenarios based at least in part on one or more adaptive beam weights used for blockage mitigation at the UE, the one or more blockage scenarios associated with respective positions of a body or hand relative to one or more antennas of the UE, wherein the blockage transformation information comprises an indication of a transformation matrix used for a transformation of a first electric field matrix associated with a non-blockage scenario to a second electric field matrix associated with a blockage scenario; and transmitting, to a machine learning server, a message indicating the blockage transformation information based at least in part on generating the blockage transformation information.

Aspect 2: The method of aspect 1, further comprising: transmitting, to the machine learning server, an indication of blockage information corresponding to blockage caused by a position of the body or hand relative to the one or more antennas.

Aspect 3: The method of aspect 2, wherein the blockage information comprises one or both of hand grip information or skin properties, the skin properties comprising a conductivity value, a dielectric constant, permittivity information, or a combination thereof.

Aspect 4: The method of any of aspects 2 through 3, wherein the blockage transformation information corresponds to the one or more blockage scenarios based at least in part on the blockage information.

Aspect 5: The method of any of aspects 1 through 4, further comprising: selecting the one or more adaptive beam weights for the blockage mitigation based at least in part on one or more codebooks configured at the UE; and transmitting, to the machine learning server, an indication of the one or more adaptive beam weights associated with the blockage mitigation at the UE.

Aspect 6: The method of any of aspects 1 through 5, further comprising: transmitting, to the machine learning server, an indication of antenna properties associated with the one or more antennas of the UE.

Aspect 7: The method of aspect 6, wherein the antenna properties comprise antenna array geometry, antenna array dimensions, antenna module placement, inter-antenna element spacing information, housing properties, a dielectric constant, or any combination thereof.

Aspect 8: The method of any of aspects 1 through 7, further comprising: performing, for each antenna element of the one or more antennas of the UE, a transformation of data from the first electric field matrix associated with the non-blockage scenario to data from the second electric field matrix associated with the blockage scenario, wherein the blockage transformation information is generated based at least in part on performing the transformation.

Aspect 9: The method of aspect 8, wherein the blockage transformation information corresponds to a quantization of information associated with the transformation, the quantization of information comprising a quantization of one or more sample angles and one or more quantized values of phases or gains.

Aspect 10: The method of any of aspects 1 through 9, further comprising: receiving, from a network entity, a control message comprising a second set of adaptive beam weights for blockage mitigation in response to joining a network, wherein the second set of adaptive beam weights is based at least in part on one or more machine learning functions; and performing a blockage mitigation procedure based at least in part on the second set of adaptive beam weights.

Aspect 11: The method of any of aspects 1 through 10, wherein the first electric field matrix represents a polarized set of electric fields across a plurality of antenna elements at the UE associated with the non-blockage scenario and the second electric field matrix represents a polarized set of electric fields across the plurality of antenna elements at the UE associated with the blockage scenario.

Aspect 12: The method of any of aspects 1 through 11, wherein the one or more adaptive beam weights comprise a plurality of adaptive beam weights associated with a respective hand or body blockage scenario.

Aspect 13: A method for wireless communication, comprising: receiving, from a plurality of UEs, respective messages that each indicate blockage transformation information associated with one or more blockage scenarios at a respective UE of the plurality of UEs, the one or more blockage scenarios associated with a position of a respective body or hand relative to one or more antennas of the respective UE; generating a set of adaptive beam weights using a machine learning model based at least in part on the blockage transformation information; and transmitting, to a first UE, the set of adaptive beam weights for blockage mitigation at the first UE based at least in part on generating the set of adaptive beam weights.

Aspect 14: The method of aspect 13, further comprising: receiving, from the plurality of UEs, respective indications of blockage information corresponding to blockage caused by a position of the respective body or hand relative to the one or more antennas of the respective UE, wherein generating the set of adaptive beam weights using the machine learning model is based at least in part on the blockage information.

Aspect 15: The method of aspect 14, wherein the blockage information comprises one or both of hand grip information or skin properties, the skin properties comprising a conductivity value, a dielectric constant, permittivity information, or a combination thereof.

Aspect 16: The method of any of aspects 14 through 15, wherein the blockage transformation information corresponds to one or more blockage scenarios based at least in part on the blockage information.

Aspect 17: The method of any of aspects 13 through 16, further comprising: receiving, from the plurality of UEs, respective indications of adaptive beam weights associated with the blockage mitigation at the plurality of UEs, wherein generating the set of adaptive beam weights using the machine learning model is based at least in part on the adaptive beam weights associated with the blockage mitigation at the plurality of UEs.

Aspect 18: The method of any of aspects 13 through 17, further comprising: receiving, from the plurality of UEs, respective indications of antenna properties associated with the plurality of UEs, wherein generating the set of adaptive beam weights using the machine learning model is based at least in part on the antenna properties.

Aspect 19: The method of aspect 18, wherein the antenna properties comprise antenna array geometry, antenna array dimensions, antenna module placement, inter-antenna element spacing, housing properties, or any combination thereof.

Aspect 20: The method of any of aspects 13 through 19, wherein the blockage transformation information comprises a transformation matrix for a transformation of a first matrix of electric fields associated with a non-blockage scenario to a second matrix of electric fields associated with a blockage scenario.

Aspect 21: The method of aspect 20, wherein the first matrix represents a polarized set of electric fields across a plurality of antenna elements at a respective UE of the plurality of UEs and associated with the non-blockage scenario and the second matrix represents a polarized set of electric fields across the plurality of antenna elements at the respective UE and associated with the blockage scenario.

Aspect 22: The method of any of aspects 13 through 21, wherein the blockage transformation information corresponds to a quantization of information associated with respective transformations by the plurality of UEs, the quantization of information comprising a quantization of one or more sample angles and one or more quantized values of phases or gains.

Aspect 23: The method of any of aspects 13 through 22, wherein the set of adaptive beam weights is transmitted to the first UE in response to the first UE joining a network.

Aspect 24: The method of any of aspects 13 through 23, wherein the set of adaptive beam weights comprises a plurality of adaptive beam weights associated with a respective hand blockage scenario.

Aspect 25: An apparatus for wireless communication at a UE, comprising a processor; memory coupled with the processor; and instructions stored in the memory and executable by the processor to cause the apparatus to perform a method of any of aspects 1 through 12.

Aspect 26: An apparatus for wireless communication at a UE, comprising at least one means for performing a method of any of aspects 1 through 12.

Aspect 27: A non-transitory computer-readable medium storing code for wireless communication at a UE, the code comprising instructions executable by a processor to perform a method of any of aspects 1 through 12.

Aspect 28: An apparatus for wireless communication, comprising a processor; memory coupled with the processor; and instructions stored in the memory and executable by the processor to cause the apparatus to perform a method of any of aspects 13 through 24.

Aspect 29: An apparatus for wireless communication, comprising at least one means for performing a method of any of aspects 13 through 24.

Aspect 30: A non-transitory computer-readable medium storing code for wireless communication, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, software, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, software, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., including a list of items prefaced by a phrase such as "at least one of" or "one or more of")

indicates an inclusive list such that, for example, a list of at least one of A, B, or C means e.g., A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" or "identify" or "identifying" encompasses a variety of actions and, therefore, "determining" or "identifying" can include calculating, computing, processing, deriving, investigating, looking up (such as via looking up in a table, a database or another data structure), ascertaining and the like. Also, "determining" or "identifying" can include receiving (such as receiving information or signaling, e.g., receiving information or signaling for determining, receiving information or signaling for identifying), accessing (such as accessing data in a memory, or accessing information) and the like. Also, "determining" or "identifying" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
    at least one processor; and
    memory coupled with the at least one processor, the memory storing instructions executable by the at least one processor to cause the UE to:
        generate blockage transformation information associated with one or more blockage scenarios based at least in part on one or more adaptive beam weights used for blockage mitigation at the UE, the one or more blockage scenarios associated with respective positions of a body or hand relative to one or more antennas of the UE, wherein the blockage transformation information comprises an indication of a transformation matrix used for a transformation of a first electric field matrix associated with a non-blockage scenario to a second electric field matrix associated with a blockage scenario; and
        transmit, to a machine learning server, a message indicating the blockage transformation information based at least in part on generating the blockage transformation information.

2. The apparatus of claim 1, wherein the instructions are further executable by the at least one processor to cause the apparatus to:
    transmit, to the machine learning server, an indication of blockage information corresponding to blockage caused by a position of the body or hand relative to the one or more antennas.

3. The apparatus of claim 2, wherein the blockage information comprises one or both of hand grip information or skin properties, the skin properties comprising a conductivity value, a dielectric constant, permittivity information, or a combination thereof.

4. The apparatus of claim 2, wherein the blockage transformation information corresponds to the one or more blockage scenarios based at least in part on the blockage information.

5. The apparatus of claim 1, wherein the instructions are further executable by the at least one processor to cause the apparatus to:
    select the one or more adaptive beam weights for the blockage mitigation based at least in part on one or more codebooks configured at the UE; and
    transmit, to the machine learning server, an indication of the one or more adaptive beam weights associated with the blockage mitigation at the UE.

6. The apparatus of claim 1, wherein the instructions are further executable by the at least one processor to cause the apparatus to:
    transmit, to the machine learning server, an indication of antenna properties associated with the one or more antennas of the UE.

7. The apparatus of claim 6, wherein the antenna properties comprise antenna array geometry, antenna array dimensions, antenna module placement, inter-antenna element spacing information, housing properties, a dielectric constant, or any combination thereof.

8. The apparatus of claim 1, wherein the instructions are further executable by the at least one processor to cause the apparatus to:
    perform, for each antenna element of the one or more antennas of the UE, a transformation of data from the first electric field matrix associated with the non-blockage scenario to data from the second electric field matrix associated with the blockage scenario, wherein the blockage transformation information is generated based at least in part on performing the transformation.

9. The apparatus of claim 8, wherein the blockage transformation information corresponds to a quantization of information associated with the transformation, the quantization of information comprising a quantization of one or more sample angles and one or more quantized values of phases or gains.

10. The apparatus of claim 1, wherein the instructions are further executable by the at least one processor to cause the apparatus to:
receive, from a network entity, a control message comprising a second set of adaptive beam weights for blockage mitigation in response to joining a network, wherein the second set of adaptive beam weights is based at least in part on one or more machine learning functions; and
perform a blockage mitigation procedure based at least in part on the second set of adaptive beam weights.

11. The apparatus of claim 1, wherein the first electric field matrix represents a polarized set of electric fields across a plurality of antenna elements at the UE associated with the non-blockage scenario and the second electric field matrix represents a polarized set of electric fields across the plurality of antenna elements at the UE associated with the blockage scenario.

12. The apparatus of claim 1, wherein the one or more adaptive beam weights comprise a plurality of adaptive beam weights associated with a respective hand or body blockage scenario.

13. An apparatus for wireless communication, comprising:
at least one processor; and
memory coupled with the at least one processor, the memory storing instructions executable by the at least one processor to cause the apparatus to:
receive, from a plurality of user equipments (UEs), respective messages that each indicate blockage transformation information associated with one or more blockage scenarios at a respective UE of the plurality of UEs, the one or more blockage scenarios associated with a position of a respective body or hand relative to one or more antennas of the respective UE;
generate a set of adaptive beam weights using a machine learning model based at least in part on the blockage transformation information; and
transmit, to a first UE, the set of adaptive beam weights for blockage mitigation at the first UE based at least in part on generating the set of adaptive beam weights.

14. The apparatus of claim 13, wherein the instructions are further executable by the at least one processor to cause the apparatus to:
receive, from the plurality of UEs, respective indications of blockage information corresponding to blockage caused by a position of the respective body or hand relative to the one or more antennas of the respective UE, wherein generating the set of adaptive beam weights using the machine learning model is based at least in part on the blockage information.

15. The apparatus of claim 14, wherein the blockage information comprises one or both of hand grip information or skin properties, the skin properties comprising a conductivity value, a dielectric constant, permittivity information, or a combination thereof.

16. The apparatus of claim 14, wherein the blockage transformation information corresponds to one or more blockage scenarios based at least in part on the blockage information.

17. The apparatus of claim 13, wherein the instructions are further executable by the at least one processor to cause the apparatus to:
receive, from the plurality of UEs, respective indications of adaptive beam weights associated with the blockage mitigation at the plurality of UEs, wherein generating the set of adaptive beam weights using the machine learning model is based at least in part on the adaptive beam weights associated with the blockage mitigation at the plurality of UEs.

18. The apparatus of claim 13, wherein the instructions are further executable by the at least one processor to cause the apparatus to:
receive, from the plurality of UEs, respective indications of antenna properties associated with the plurality of UEs, wherein generating the set of adaptive beam weights using the machine learning model is based at least in part on the antenna properties.

19. The apparatus of claim 18, wherein the antenna properties comprise antenna array geometry, antenna array dimensions, antenna module placement, inter-antenna element spacing, housing properties, or any combination thereof.

20. The apparatus of claim 13, wherein the blockage transformation information comprises a transformation matrix for a transformation of a first matrix of electric fields associated with a non-blockage scenario to a second matrix of electric fields associated with a blockage scenario.

21. The apparatus of claim 20, wherein the first matrix represents a polarized set of electric fields across a plurality of antenna elements at a respective UE of the plurality of UEs and associated with the non-blockage scenario and the second matrix represents a polarized set of electric fields across the plurality of antenna elements at the respective UE and associated with the blockage scenario.

22. The apparatus of claim 13, wherein the blockage transformation information corresponds to a quantization of information associated with respective transformations by the plurality of UEs, the quantization of information comprising a quantization of one or more sample angles and one or more quantized values of phases or gains.

23. The apparatus of claim 13, wherein the set of adaptive beam weights is transmitted to the first UE in response to the first UE joining a network.

24. The apparatus of claim 13, wherein the set of adaptive beam weights comprises a plurality of adaptive beam weights associated with a respective hand blockage scenario.

25. A method for wireless communication at a user equipment (UE), comprising:
generating blockage transformation information associated with one or more blockage scenarios based at least in part on one or more adaptive beam weights used for blockage mitigation at the UE, the one or more blockage scenarios associated with respective positions of a body or hand relative to one or more antennas of the UE, wherein the blockage transformation information comprises an indication of a transformation matrix used for a transformation of a first electric field matrix associated with a non-blockage scenario to a second electric field matrix associated with a blockage scenario; and transmitting, to a machine learning server, a message indicating the blockage transformation information based at least in part on generating the blockage transformation information.

26. The method of claim 25, further comprising:
transmitting, to the machine learning server, an indication of blockage information corresponding to blockage caused by a position of the body or hand relative to the one or more antennas.

27. The method of claim 26, wherein the blockage information comprises one or both of hand grip information or skin properties, the skin properties comprising a conductivity value, a dielectric constant, permittivity information, or a combination thereof.

28. A method for wireless communication, comprising:
receiving, from a plurality of user equipments (UEs), respective messages that each indicate blockage transformation information associated with one or more blockage scenarios at a respective UE of the plurality of UEs, the one or more blockage scenarios associated with a position of a respective body or hand relative to one or more antennas of the respective UE;

generating a set of adaptive beam weights using a machine learning model based at least in part on the blockage transformation information; and transmitting, to a first UE, the set of adaptive beam weights for blockage mitigation at the first UE based at least in part on generating the set of adaptive beam weights.

29. The method of claim 28, further comprising:
receiving, from the plurality of UEs, respective indications of blockage information corresponding to blockage caused by a position of the respective body or hand relative to the one or more antennas of the respective UE, wherein generating the set of adaptive beam weights using the machine learning model is based at least in part on the blockage information.

30. The method of claim 29, wherein the blockage information comprises one or both of hand grip information or skin properties, the skin properties comprising a conductivity value, a dielectric constant, permittivity information, or a combination thereof.

* * * * *